US 8,570,759 B2

(12) United States Patent
Takahashi et al.

(10) Patent No.: US 8,570,759 B2
(45) Date of Patent: Oct. 29, 2013

(54) CONTROLLER AND PORTABLE ELECTRONIC APPARATUS

(75) Inventors: Nobuyuki Takahashi, Tokyo (JP); Hiroaki Masuda, Tochigi (JP); Ken Yano, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/590,866

(22) Filed: Aug. 21, 2012

(65) Prior Publication Data

US 2012/0312665 A1    Dec. 13, 2012

Related U.S. Application Data

(63) Continuation of application No. 12/687,229, filed on Jan. 14, 2010, now Pat. No. 8,267,787.

(30) Foreign Application Priority Data

Jan. 16, 2009    (JP) ................................ 2009-008269
May 13, 2009    (JP) ................................ 2009-117057

(51) Int. Cl.
*A63F 9/24* (2006.01)
*A63F 13/00* (2006.01)
*G06F 17/00* (2006.01)
*G06F 19/00* (2011.01)
*H05K 5/00* (2006.01)

(52) U.S. Cl.
USPC ............................................ 361/756; 463/37

(58) Field of Classification Search
None
See application file for complete search history.

(56) References Cited

U.S. PATENT DOCUMENTS

| 5,757,292 | A | 5/1998 | Amro |
| 6,616,534 | B2 * | 9/2003 | Cheng ............................ 463/37 |
| 6,984,793 | B1 | 1/2006 | Chew |
| 7,193,165 | B2 | 3/2007 | Kawanobe |

(Continued)

FOREIGN PATENT DOCUMENTS

| CN | 1950132 A | 4/2007 |
| DE | 19926334 A1 | 12/2000 |

(Continued)

OTHER PUBLICATIONS

Office Action for corresponding application CN 201010003764.8, dated Apr. 19, 2012.

(Continued)

*Primary Examiner* — Hoa C Nguyen
*Assistant Examiner* — Xanthia C Cunningham
(74) *Attorney, Agent, or Firm* — Matthew B. Dernier, Esq.; Gibson & Dernier LLP

(57) ABSTRACT

A controller includes a housing and at least one key provided for protruding and retreating movement on the housing. The key includes: a body formed in a transversely elongated configuration elongated in a first direction; and a first stem positioned on one end side of the body in the first direction and extending along a third direction which is substantially perpendicular to the first direction and a second direction which is a protruding direction of the key from the housing. The housing includes: a biasing member for biasing the key in the second direction; and a first restricting portion positioned on the second direction side with respect to the first stem for engaging with the first stem biased by the biasing member.

9 Claims, 18 Drawing Sheets

(56) References Cited

U.S. PATENT DOCUMENTS

| | | |
|---|---|---|
| 7,235,012 B2 * | 6/2007 | DiDato .......................... 463/38 |
| 7,246,115 B2 | 7/2007 | Zhang et al. |
| 7,625,286 B2 | 12/2009 | Hamada |
| 7,677,754 B2 * | 3/2010 | Cheah .......................... 362/184 |
| D631,922 S * | 2/2011 | Kang .......................... D21/566 |
| 8,033,914 B2 * | 10/2011 | Yoshikawa et al. ............. 463/36 |
| 2002/0034964 A1 | 3/2002 | Bannai |
| 2005/0247550 A1 | 11/2005 | Hamada |
| 2006/0021859 A1 | 2/2006 | Chew |
| 2006/0025217 A1 * | 2/2006 | Hussaini et al. ................ 463/36 |
| 2006/0258456 A1 | 11/2006 | Kawanobe |
| 2007/0123309 A1 | 5/2007 | Sano |
| 2007/0218995 A1 * | 9/2007 | Didato .......................... 463/37 |
| 2007/0243933 A1 * | 10/2007 | Cheng .......................... 463/37 |
| 2007/0281787 A1 | 12/2007 | Numata |
| 2008/0032795 A1 * | 2/2008 | Sternberg et al. ............... 463/36 |
| 2008/0225495 A1 | 9/2008 | Lee |
| 2008/0261659 A1 | 10/2008 | Jang |
| 2008/0274776 A1 | 11/2008 | Cho |
| 2009/0147485 A1 | 6/2009 | Higashigawa |
| 2009/0181734 A1 | 7/2009 | Kato |
| 2010/0222109 A1 | 9/2010 | Paek |

FOREIGN PATENT DOCUMENTS

| | | | |
|---|---|---|---|
| JP | 61285620 | A | 12/1986 |
| JP | 6251611 | A | 3/1987 |
| JP | 63091727 | A | 4/1988 |
| JP | 6314531 | A | 11/1994 |
| JP | 2001034247 | A | 2/2001 |
| JP | 2003053037 | A | 2/2003 |
| JP | 2005276650 | A | 10/2005 |
| JP | 2006294322 | A | 10/2006 |
| JP | 2006318872 | A | 11/2006 |
| JP | 2007296247 | A | 11/2007 |
| JP | 2007299706 | A | 11/2007 |

OTHER PUBLICATIONS

Office Action for corresponding application JP 2009-117057, dated Aug. 23, 2011.
Office Action for corresponding application JP 2009-117057, dated Feb. 22, 2011.
Office Action for corresponding application JP 2009-008269, dated Oct. 5, 2010.
European search report for corresponding application EP10250072.5, dated Jul. 1, 2010.
U.S. Office action for related U.S. Appl. No. 12/687,229, dated Feb. 1, 2012.

* cited by examiner

CONTROLLER AND PORTABLE ELECTRONIC APPARATUS

CROSS REFERENCE TO RELATED APPLICATIONS

This is a continuation application of U.S. patent application Ser. No. 12/687,229, filed Jan. 14, 2010, which has been allowed, the entire disclosure of which is hereby incorporated by reference, and this application claims priority to Japanese Patent Application Nos. 2009-008269, filed Jan. 16, 2009, and 2009-117057, filed May 13, 2009, the entire disclosures of which are expressly incorporated by reference herein.

BACKGROUND OF THE INVENTION

1. Field of the Invention

This invention relates to a controller and a portable electronic apparatus.

2. Description of Related Art

A controller connected to a game machine of the stationary type, a PC (Personal Computer) and so forth is known. Further, a personal digital assistant wherein a terminal equipment for processing predetermined information and a controller are integrated is known. Such controllers as mentioned above have a plurality of keys disposed thereon for being operated for inputting. However, since a controller is frequently grasped by both hands of a user when it is used, the number and arrangement of keys for inputting are inevitably restricted. On a front face of such a controller as described above, a direction key which is depressed by the thumb of the left hand is frequently disposed on the left side while a plurality of independent keys which are depressed by the thumb of the right hand are disposed on the right side.

In recent years, a large number of applications for games for which complicated inputting operations are required have been developed, and it is demanded to increase keys to be disposed on a controller. In order to satisfy such a demand as just described, a portable electronic apparatus is known wherein a pair of keys are disposed on an upper face when a controller is grasped (refer to, for example, Published U.S. Patent Application No. 2005/0247550: hereinafter referred to as Document 1).

The portable electronic apparatus disclosed in Document 1 has a front face and a rear face and a side face which connects the front and rear faces to each other. The portable electronic apparatus includes keys disposed at the opposite left and right ends of the side face, that is, the upper face, which is positioned on the upper side when the apparatus is grasped, such that they are operated for inputting principally by the left and right forefingers. Each of the keys is configured such that it engages at one end thereof with a receiving portion extending along the upper surface of a housing while it engages at the other end thereof with another receiving portion formed on a side face of a housing positioned in the proximity of the key.

More particularly, locking means for engaging with the receiving portion on the upper surface side of the housing is provided at the one end of the key. The locking means engages with the receiving portion to restrict the key from being let off upwardly and serves as a fulcrum when the key is pivoted by being depressed at the other end side thereof. Meanwhile, different locking means for engaging with the receiving portion on the side surface side of the housing is provided at the other end of the key. The latter locking means similarly restricts letting off of the key and serves as a fulcrum when the key is pivoted by being depressed at the one end thereof.

Such a key as described above is configured such that, at whichever position of the one end side, the other end side and a central portion the key is depressed, it can electrically connect a conducing member disposed below the key and a switch contact to each other.

However, since the size of the hands of a user who grasps the controller varies much depending upon the age, sex and so forth, a controller is demanded on which an inputting operation can be carried out readily and with certainty without depending upon the position of the hands, particularly of the fingers, when the controller is grasped. Also a demand for reduction of the thickness and size of the housing is increasing in order to improve the portability and so forth. However, if the size of the housing is reduced, then the depression position of the keys varies depending upon the manner in which the user holds the controller, the size of the hands or fingers of the user and like factors. Therefore, it is demanded to provide a configuration which allows detection of an inputting operation of a key by causing the key to be protruded and retracted appropriately at whichever position the key is depressed.

SUMMARY OF THE INVENTION

It is desirable to provide a controller and a portable electronic apparatus which can achieve improved operability and can achieve reduction in thickness and size thereof and besides allows a key thereof to be operated for inputting with certainty.

In order to attain the object described above, according to an embodiment of the present invention, there is provided a controller including a housing, and a key provided for protruding and retreating movement on the housing. The housing has a front face, a rear face, and a side face for connecting the front face and the rear face to each other. The key has a body having one end inserted in an opening formed in the side face and the other end exposed to the outside of the housing, and an extension extending along the side face from the other end of the body to the outside farther than an end edge of the opening.

Here, the controller preferably has a size with which it can be grasped at least with one hand.

With the controller, since the key provided thereon has the extension extending along the side face from the other end of the body, having one end inserted in the opening formed on the side face, to the outside farther than an end edge of the opening, the area of the face of the key which is exposed to the outside of the housing, that is, the area of the face which opposes to a finger of a user, can be increased. Consequently, in comparison with an alternative key which does not have the extension, the area over which the key can be depressed (area with which a finger can contact) can be expanded. Further, since the contact area when a finger contacts can be increased, the key can be depressed with certainty and hence inputting of the key can be carried out with certainty. Accordingly, the operability of the controller can be improved.

Further, since the extension is formed such that it extends to the outer side farther than the end edge of the opening, in comparison with an alternative case wherein the opening is formed in an increased size and a key corresponding to the opening area of the opening is disposed, the thicknesswise dimension of the housing can be reduced. Accordingly, reduction in thickness of the controller can be anticipated.

In order to achieve miniaturization, a controller and a personal digital assistance sometimes adopt a configuration called clamshell type wherein two housings placed one on the other are combined for opening and closing movement or another configuration called slide type wherein such two housings are combined for sliding movement relative to each other. Where a key is provided at each of the left and right corners of a face on the depthwise direction side of one of the housings in such configurations as described above which is grasped by the user, a structure with which the keys can be operated without interference with the other housing is demanded.

With the controller of the present invention, if the extension direction of the extension is not a direction in which it approaches the other housing mentioned above (for example, if the direction is a direction in which the extension is spaced away from the other housing), then otherwise possible interference between the key and the other housing can be prevented and also interference between fingers by which the keys are operated and the other housing can be suppressed. Accordingly, in this instance, the operability of the controller can be further improved.

Preferably, the controller is configured such that the key has a body formed in a transversely elongated configuration elongated in a first direction, and a first stem positioned on one end side of the body in the first direction and extending along a third direction which is substantially perpendicular to the first direction and a second direction which is a protruding direction of the key from the housing, and the housing has a biasing member for biasing the key in the second direction, and a first restricting portion positioned on the second direction side with respect to the first stem for engaging with the first stem biased by the biasing member, one of the key and the housing has a second stem positioned on the other end side of the first direction and extending in the third direction while the other of the key and the housing has a guide portion which sandwiches an end of the second stem for guiding movement of the second stem in the second direction and a second restricting portion for engaging with the second stem biased by the biasing member.

It is to be noted that the dimension of the key in the first direction which is the longitudinal direction may be set to such a dimension that, when the key is depressed at one end thereof in the first direction by a finger of a user, not the entire key is retracted into the housing but the key is pivoted around the other end side, whereupon the one end side of the key is retracted into the housing. Such a dimension as just described may be, for example, equal to or greater than a dimension from the finger tip to the first joint (distal interphalangeal joint).

With the controller, where the key is not depressed, movement of the first stem in the second direction by the biasing force of the biasing member is restricted by the first restricting portion and the second restricting portion. Therefore, letting off of the key from the housing can be prevented.

Meanwhile, where the key is depressed at a substantially central portion of the body thereof in the first direction (longitudinal direction), the key is guided by the guide portion and the second stem and is retracted into the housing along the depression direction against the biasing force of the biasing member. Thereupon, since the guide portion sandwiches the end of the second stem, rocking motion of the key in the first direction upon retraction of the key can be suppressed.

On the other hand, where the key is depressed on the one end side of the body thereof in the first direction, the key is pivoted in the depression direction around the second stem which is engaged by the second restricting portion biased by the biasing member. Also where the key is depressed at the other end side of the body thereof in the first direction, the key is pivoted in the depression direction around the first stem which is engaged by the first restricting portion biased similarly. Also upon such pivotal motion of the key, since movement of the second stem in the first direction is restricted by the guide portion, rocking motion of the key in the first direction upon retraction of the key can be suppressed.

Therefore, at whichever position the key is depressed, rocking motion of the key in the first direction in response to movement of the key can be suppressed. Further, since the second stem is sandwiched by the guide portion, displacement of the end of the key on the side on which the second stem is positioned upon pivotal motion of the key does not occur, and therefore, there is no necessity to form a large clearance between the end of the key and the housing. Consequently, miniaturization of the controller can be anticipated.

Further, since the key carries out movement or pivotal motion in the depression direction in response to the depression position, there is no necessity to provide a long guide along which the entire key moves in the depression direction at whichever position the key is depressed. Therefore, miniaturization of the controller can be anticipated.

Accordingly, at whichever position the key is depressed, inputting of the key can be carried out with certainty and besides miniaturization of the controller can be anticipated.

According to another embodiment of the present invention, there is provided a portable electronic apparatus including the controller described above.

With the portable electronic apparatus, similar effects to those which are achieved by the controller described above can be achieved. Further, since operation of the key is stabilized, the key can be inputted with certainty, and the portable electronic apparatus of the configuration described can achieve miniaturization.

With the present invention, the controller can be improved in operability and can achieve reduction in thickness thereof. Further, since rocking motion of the key upon depression can be suppressed, operation of the key can be stabilized and besides miniaturization can be achieved.

DETAILED DESCRIPTION OF PREFERRED EMBODIMENTS

1. First Embodiment

In the following, a first embodiment of the present invention is described with reference to the drawings.

Appearance Configuration of the Portable Electronic Apparatus

Figure 1:
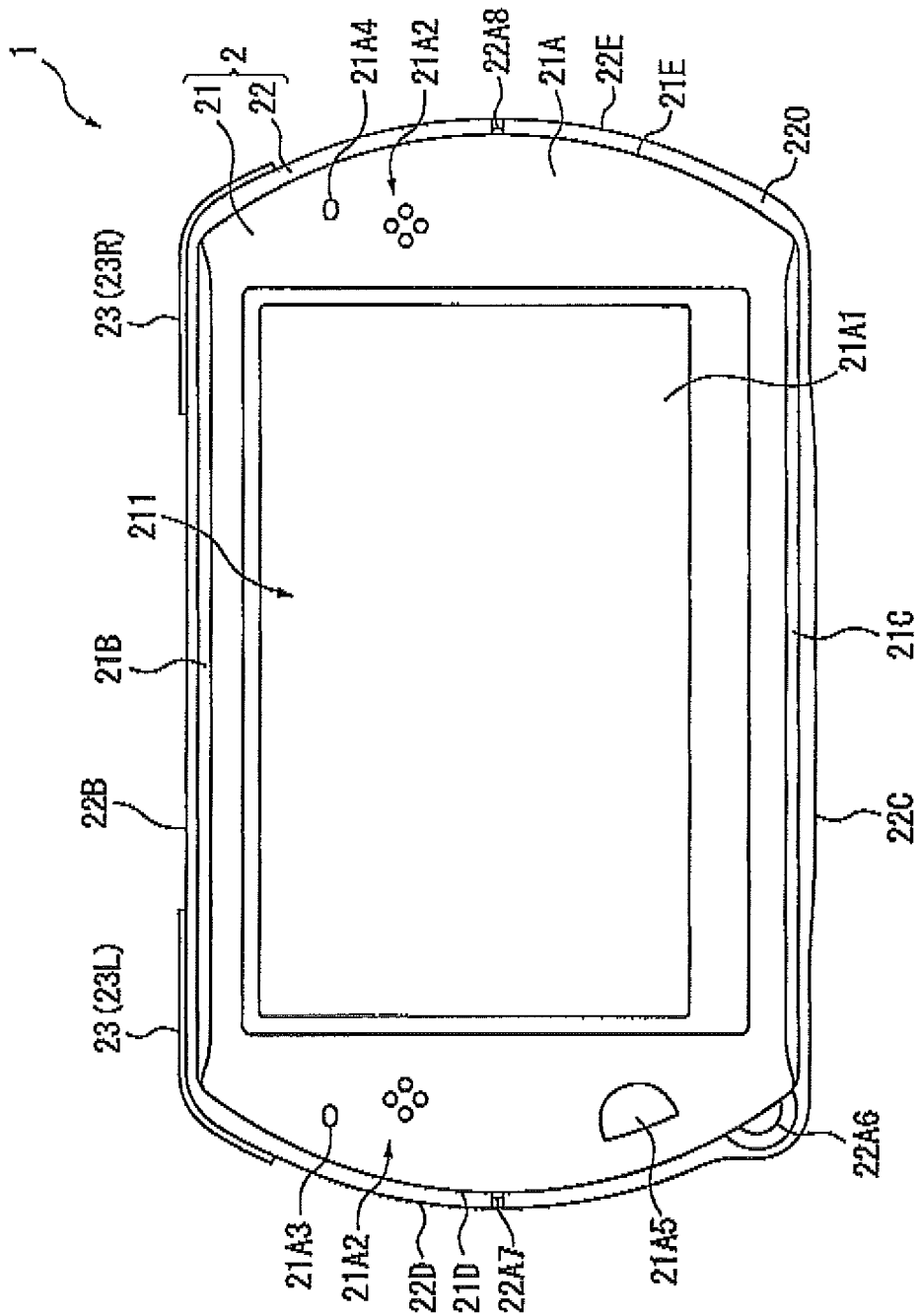
FIGS. 1 and 2 are schematic views of a portable electronic apparatus according to a first embodiment of the present invention as viewed from the front side.
Figure 2:
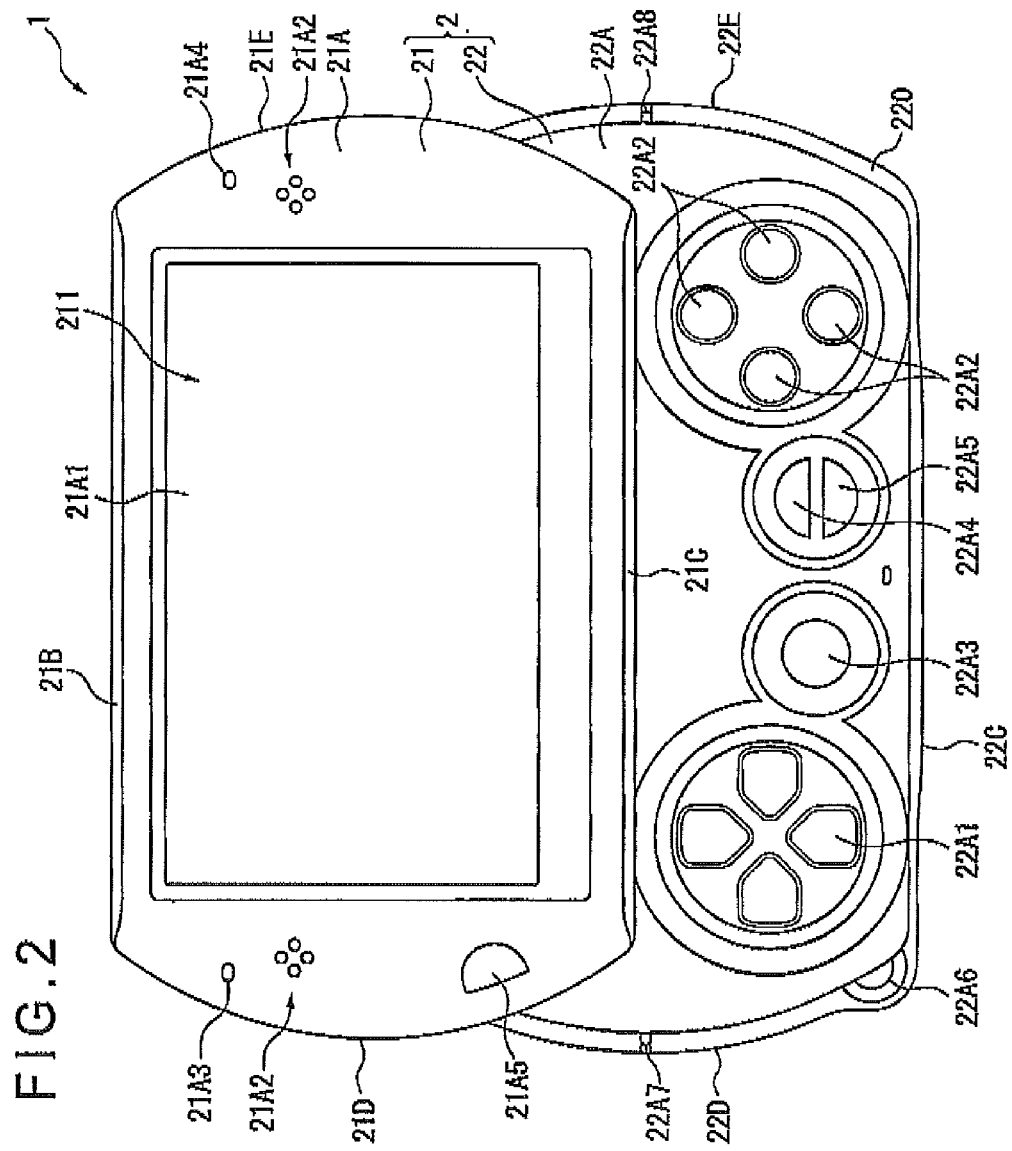

FIGS. 1 and 2 are views of a portable electronic apparatus 1 according to the present embodiment as viewed from the front side. Particularly, FIG. 2 is a view of the portable electronic apparatus 1 in a state wherein a front case 21 of the portable electronic apparatus 1 is slidably moved upwardly with respect to a rear case 22 from a position thereof shown in FIG. 1.

The portable electronic apparatus 1 according to the present embodiment corresponds to a controller and a portable electronic apparatus of the present invention and processes programs and data stored in a storage medium such as a memory card loaded therein and programs and data acquired through communication with an external apparatus such as a server. For example, the portable electronic apparatus 1 processes game programs, image data and sound data. Such a portable electronic apparatus 1 as just described includes an armor case 2 and a terminal body 3 (FIG. 8) accommodated in the armor case 2 for executing the process described above as seen in FIGS. 1 and 2.

The armor case 2 includes the front case 21 positioned on this side (front side) to a user who grasps the portable electronic apparatus 1 and the rear case 22 positioned on the rear side of the front case 21. The rear case 22 corresponds to a housing.

Where the front case 21 and the rear case 22 are individually viewed from the front side (the side opposing to the user), they have a substantially oval shape formed from a rectangle elongated in the leftward and rightward direction (leftward and rightward direction in FIGS. 1 and 2) and swollen arcuately at the opposite left and right end edges thereof. The rear case 22 is formed a little larger than the front case 21. More particularly, the rear case 22 includes a framework member 220 made of a metal and covering an outer edge thereof adjacent the front case 21, and the rear case 22 is greater than the front case 21 by a dimension equal to the dimension of the framework member 220. The cases 21 and 22 are individually formed in a substantially flattened configuration, and one of the cases 21 and 22 is slidably movable in the upward and downward directions with respect to the other of the cases 21 and 22. It is to be noted that, although the cases 21 and 22 are made of a synthetic resin, they may otherwise be formed from a metal.

An upper face 21B (FIG. 3), a lower face 21C (FIG. 4), a left side face 21D (FIG. 5) and a right side face 21E (FIG. 6) of the front case 21 are inclined (curved) in a direction in which they approach the center of the front case 21 toward the direction away from the rear case 22. Therefore, the front case 21 is formed in a substantially trapezoidal shape as viewed in vertical section and transverse section as seen in FIGS. 3 to 6.

Configuration of the Front Portion

A display 211 accommodated in the front case 21 and formed from a liquid crystal panel is disposed substantially at the center of a front face 21A of the front case 21 as seen in FIGS. 1 and 2. A translucent section 21A1 is formed in a region of the front case 21 corresponding to the display 211. Therefore, the user would observe an image displayed on the display 211 through the translucent section 21A1. It is to be noted that the display 211 may be formed using some other display means such as an organic EL (Electro-Luminescence) panel or the like in place of the liquid crystal panel.

A pair of sound outputting holes 21A2 are formed at locations of the front case 21 on the left and right sides with respect to the translucent section 21A1 such that sound from a speaker (not shown) accommodated in the front case 21 is outputted therethrough.

A pair of left and right indicators 21A3 and 21A4 are disposed above the sound outputting holes 21A2. Of the indicators 21A3 and 21A4, the left side indicator 21A3 indicates a communication state by a radio module hereinafter described while the right side indicator 21A4 indicates a communication state by the Bluetooth (register trademark) of the terminal body 3. Each of the indicators 21A3 and 21A4 is formed from an LED (Light Emitting Diode).

Meanwhile, a key 21A5 which can be depressed in a direction toward the interior is provided on the left side with respect to the front face 21A and below the left side sound outputting holes 21A2. This key 21A5 is a "HOME" key for changing over a program being executed.

In a region of a front face 22A of the rear case 22 which is exposed when the front case 21 is slidably moved upwardly with respect to the rear case 22, a direction key 22A1 which can input eight directions of upward, downward, leftward and rightward directions and oblique directions is disposed at a left portion and four keys 22A2 positioned at the apexes of a diamond shape are disposed at a right portion as seen in FIG. 2. Further, an analog device 22A3 mounted for sliding movement along the front face 22A for detecting the direction of sliding movement is disposed at a left portion in such a manner as to be sandwiched between the direction key 22A1 and the keys 22A2, and a pair of semicircular keys 22A4 and 22A5 are disposed at a right portion such that they are juxtaposed upwardly and downwardly. The keys 22A4 and 22A5 are a "SELECT" key and a "START" key which are used during execution of a game program or the like.

Further, at a left side end of the front face 22A, an attachment hole 22A6 to which a strap (not shown) is to be attached is formed. The attachment hole 22A6 is formed in the framework member 220 described hereinabove.

Furthermore, a pair of indicators 22A7 and 22A8 are disposed at the opposite left and right ends of the front face 22A and substantially at the center in the upward and downward direction. Of the indicators 22A7 and 22A8, the left side indicator 22A7 indicates a reading/recording state of data from/into a memory card (not shown) loaded in the terminal body 3 through a fitting hole 22D1 (FIG. 5) hereinafter described, and the right side indicator 22A8 indicates an on/off state of a power supply to the portable electronic apparatus 1. Both of the indicators 22A7 and 22A8 are formed from an LED. As seen in FIG. 1, the indicators 22A7 and 22A8 are disposed at positions of the front face 22A at which they do not overlap with the front case 21. Therefore, even in a state wherein the front case 21 and the rear case 22 are placed one on the other, a lighting state of the indicators 22A7 and 22A8 can be confirmed.

Configuration of the Upper Face

Figure 3:
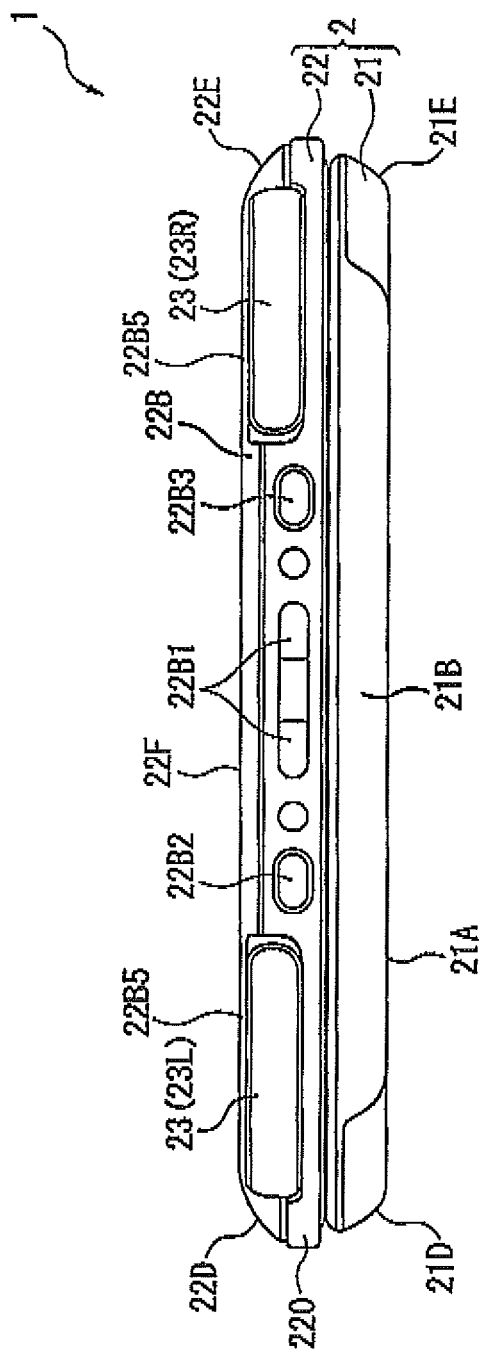
FIG. 3 is a schematic view of the portable electronic apparatus as viewed from the upper side.

FIG. 3 is a view of the portable electronic apparatus 1 as viewed from above.

A pair of LR keys 23 are disposed at the opposite ends in the leftward and rightward direction of an upper face 22B of the rear case 22 as seen in FIG. 3 (the left side one of the LR keys 23 on the upper face 22B is denoted by 23L and the right side one of the LR keys 23 on the upper face 22B is denoted by 23R). The keys 23L and 23R are formed in a substantially L shape such that they extend at one portion thereof along the upper face 22B and at the other portion thereof along a left side face 22D and a right side face 22E, respectively. In other words, the keys 23L and 23R are disposed such that they extend between and over the upper face 22B and the left and right side faces 22D and 22E, respectively.

Further, a pair of sound volume adjustment keys 22B1 for adjusting the sound volume of sound to be outputted from the speaker described hereinabove are provided substantially at the center of the upper face 22B. Furthermore, keys 22B2 and 22B3 are provided between the key 23L and one of the sound volume adjustment keys 22B1 and between the other one of the sound volume adjustment keys 22B1 and the key 23R, respectively.

Further, the upper face 22B has an opening 22B4 (FIGS. 7 and 8) and an offset portion 22B5 formed at a left end thereof. The key 23L is inserted at one end thereof in an opening 22B4, and the opening 22B4 is formed so as to extend to the left side face 22D. The offset portion 22B5 is formed in conformity with the opening 22B4 and positioned on the rear face side with respect to the opening 22B4. The upper face 22B has another opening 22B4 (FIGS. 7 and 8) and another offset portion 22B5 formed similarly at a right end thereof. The key 23R is inserted at one end thereof in another opening 22B4 similarly, and the opening 22B4 is formed so as to extend to the right side face 22E similarly. The offset portion 22B5 is formed in conformity with the opening 22B4 similarly and positioned on the rear face side with respect to the opening 22B4. It is to be noted that the keys 23L and 23R, openings 22B4 and offset portions 22B5 are hereinafter described.

Configuration of the Lower Face

Figure 4:
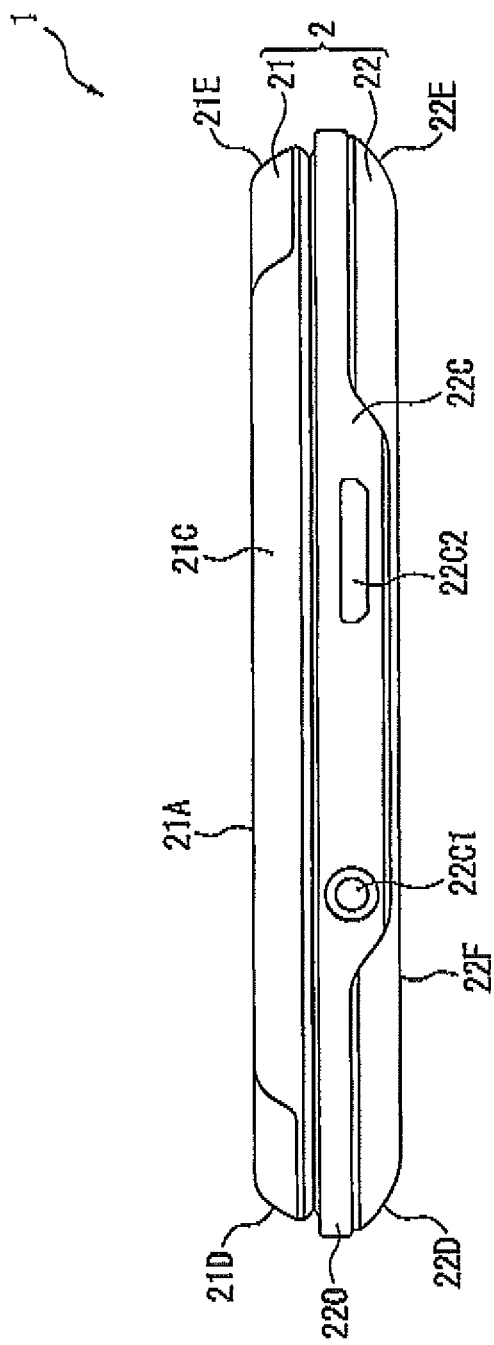
FIG. 4 is a schematic view of the portable electronic apparatus as viewed from the lower side.

FIG. 4 is a view of the portable electronic apparatus 1 as viewed from below.

A terminal 22C1 formed from an earphone jack for the connection to a headphone is provided at a left portion of a lower face 22C of the rear case 22 as seen in FIG. 4, and a terminal 22C2 for the connection to a cradle (not shown) as an external apparatus is provided at a right portion of the lower face 22C of the rear case 22. Such lower face 22C and lower face 21C as described above are each formed in a substantially flattened configuration.

It is to be noted that a positional relationship between the lower end of the lower face 21C and the lower face 22C is hereinafter described in detail.

Configuration of the Left Side Face

Figure 5:
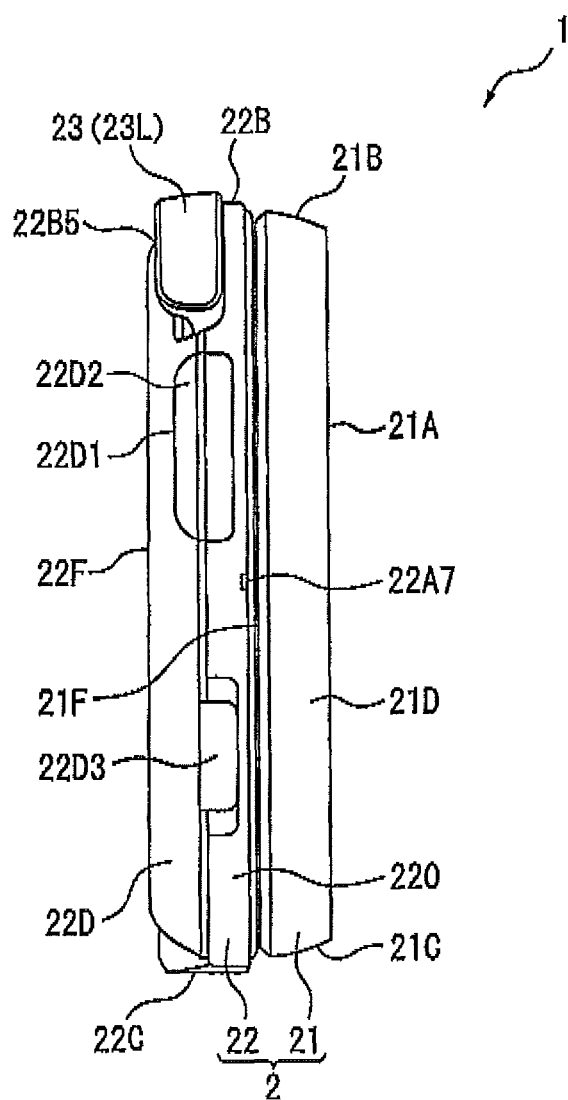
FIG. 5 is a schematic view of the portable electronic apparatus as viewed from the left side.

FIG. 5 is a view of the portable electronic apparatus 1 as viewed from the left side.

An upper end of the left side face 22D of the rear case 22 is covered with part of the key 23L described hereinabove. The fitting hole 22D1 for inserting and removing a memory card (not shown) therethrough is formed at an upper portion of the left side face 22D. A cover 22D2 for closing the fitting hole 22D1 is attached to the fitting hole 22D1. In addition, a key 22D3 is provided for sliding movement along the left side face 22D at a lower portion of the left side face 22D. This key 22D3 is provided to change over a radio module, which the terminal body 3 (FIG. 8) has, between on and off states.

It is to be noted that, as shown in FIG. 5, the lower end of the lower face 21C which is inclined in a direction in which it approaches the center as the distance from the rear case 22 increases is positioned a little higher by an amount corresponding to the framework member 220 described hereinabove with respect to the lower face 22C of the rear case 22 which extends substantially perpendicularly to a rear face 21F of the front case 21. Therefore, if a finger placed on the lower face 22C is moved toward the front case 21 side, then it can engage with the lower face 21C and can slidably move the lower face 21C and hence the front case 21 upwardly with ease.

Configuration of the Right Side Face

Figure 6:
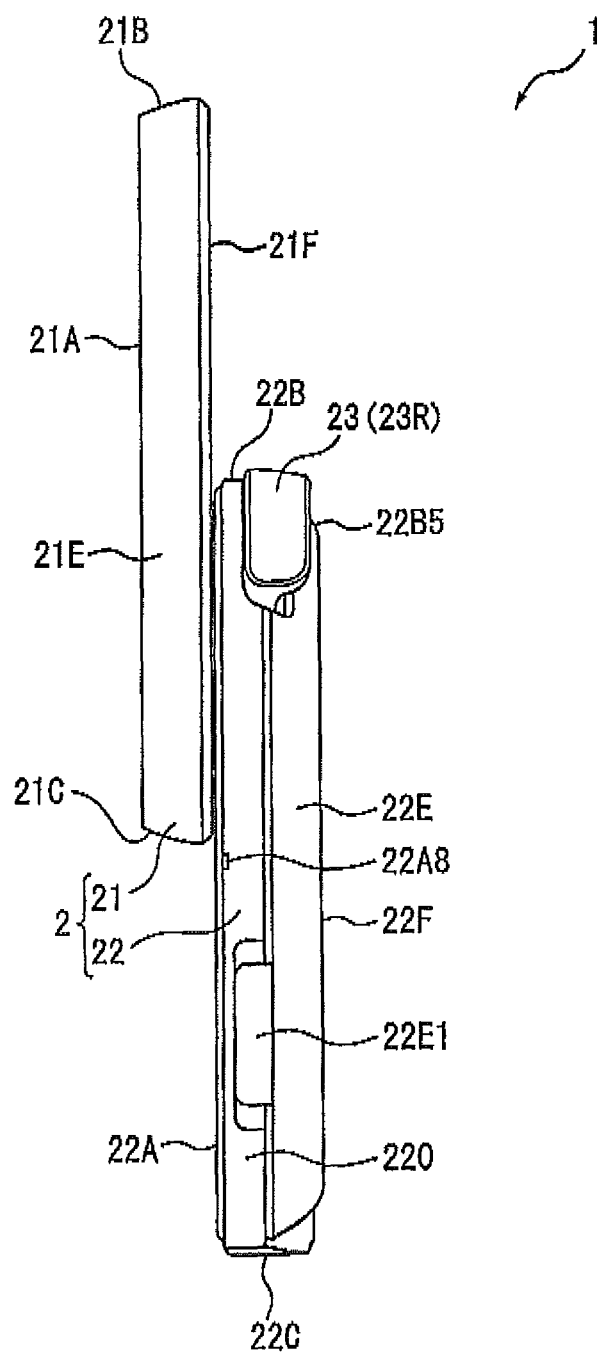
FIG. 6 is a schematic view of the portable electronic apparatus as viewed from the right side.

FIG. 6 is a view of the portable electronic apparatus 1 as viewed from the right side. It is to be noted that, in FIG. 6, the front case 21 is at a position slidably moved upwardly with respect to the rear case 22.

An upper end of the right side face 22E of the rear case 22 is covered with part of the key 23R described hereinabove similarly to the left side face 22D. A power supply key 22E1 provided for sliding movement along the right side face 22E is disposed at a lower portion of the right side face 22E. If the power supply key 22E1 is slidably moved upwardly, then the power supply of the portable electronic apparatus 1 is turned on, but if the power supply key 22E1 is slidably moved upwardly again, then the power supply is turned off. Further, if the power supply key 22E1 is slidably moved downwardly, a hold state wherein an input of any other key is canceled can be switchably established.

Configuration of the Back Rear Section

Figure 7:
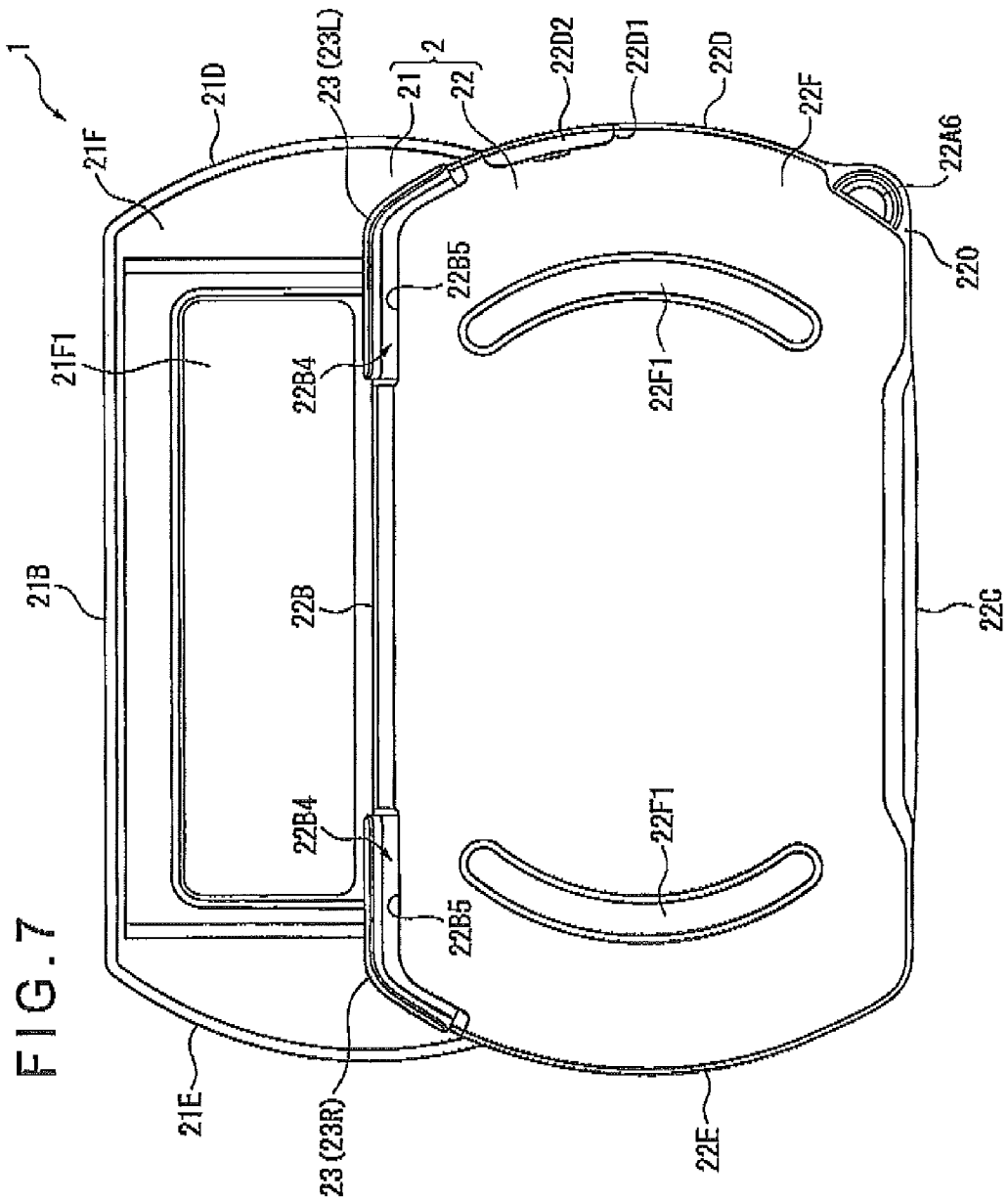
FIG. 7 is a schematic view of the portable electronic apparatus as viewed from the rear side.

FIG. 7 is a view of the portable electronic apparatus 1 as viewed from the rear side where the front case 21 is in a state slidably moved upwardly with respect to the rear case 22.

The rear face 21F of the front case 21 is concave toward the inner side so that it does not push the keys 22A1 to 22A4 disposed on the front face 22A of the rear case 22. An accommodation section 21F1 in which a circuit board (not shown) for slidably moving the display 211 described hereinabove is accommodated is formed substantially at the center of the rear face 21F. This circuit board is electrically connected to the terminal body 3 (FIG. 8) accommodated in the rear case 22 such that the display 211 is driven in response to an image signal outputted from the terminal body 3 to display an image in accordance with the image signal.

A pair of leg portions 22F1 are provided leftwardly and rightwardly substantially at the center of a rear face 22F of the rear case 22. The paired leg portions 22F1 are formed from substantially arcuate synthetic resin members opposing to each other. Where the portable electronic apparatus 1 is disposed such that the rear face 22F is opposed to the installation face, the leg portions 22F1 prevent the rear face of the armor case 2 from directly contacting with the installation face and make it easy for the user to grasp the portable electronic apparatus 1 readily.

More particularly, when the portable electronic apparatus 1 is to be grasped, the left and right forefingers would be positioned so as to engage with the upper face 22B and the side faces 22D and 22E while the left and right middle and third fingers are positioned so as to engage with the rear face 22F.

Thereupon, since the leg portions 22F1 of a substantially arcuate shape described hereinabove are provided substantially at the center of the rear face 22F such that they project from the rear face 22F, the leg portions 22F1 can be engaged by finger tips of the middle and third fingers. Consequently, a holding feeling when the portable electronic apparatus 1 is grasped can be provided to the user, and the easiness in holding and the stability upon grasping can be improved.

Disposition Positions of the LR Keys

The LR keys 23 (23L and 23R) are provided at the opposite left and right ends of the upper face 22B, respectively, as described above. A pair of openings 22B4 into each of which one end of a body 231 hereinafter described of each key 23 is to be inserted are formed at the opposite left and right ends of the upper face 22B as seen in FIG. 7. The openings 22B4 partly extend to the side faces 22D and 22E proximate to the openings 22B4 as described hereinabove.

A pair of offset portions 22B5 which are concave toward the inner side of the rear case 22 are formed on the rear surface side with respect to the openings 22B4 in accordance with the positions of the openings 22B4 as described hereinabove. Upper ends of the offset portions 22B5 are positioned lower than the upper face 22B on which the sound volume adjustment key 22B1 and so forth described hereinabove are disposed and the side faces 22D and 22E (positioned at positions rather near to the center of the rear case 22). The upper end faces of the offset portions 22B5 are covered with extensions 232 hereinafter described of the keys 23L and 23R.

Configuration of the LR Keys

Figure 8:
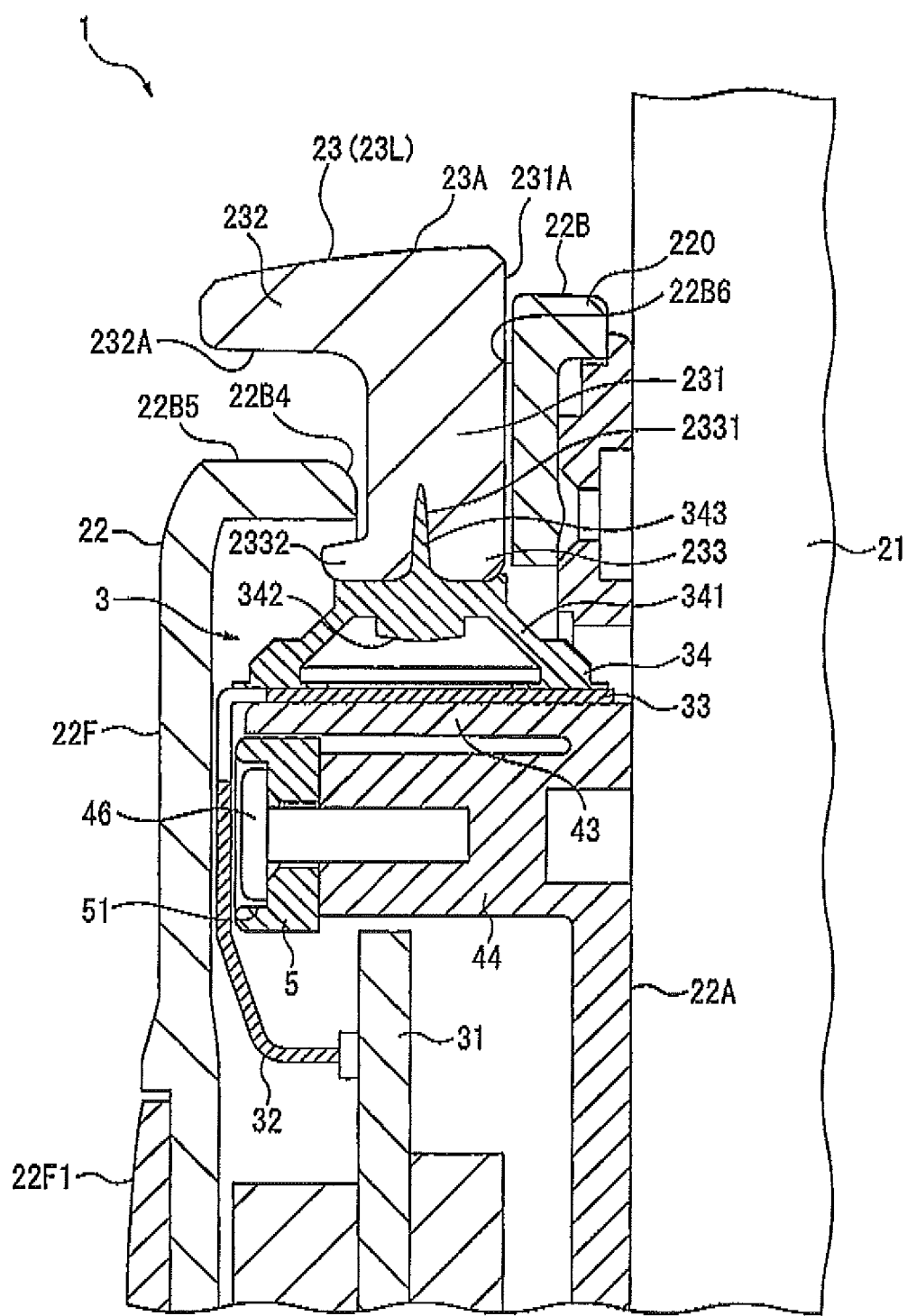
FIG. 8 is a view showing a partial vertical section of the portable electronic apparatus.

FIG. 8 is a vertical sectional view showing part of the portable electronic apparatus 1 (particularly the key 23L).

As shown in FIG. 8, the key 23L presses, through a rubber contact 34, a contact substrate 33 electrically connected to a control substrate 31 through an FPC (Flexible Printed Circuit) 32, which control substrate 31 composes the terminal body 3 accommodated in the rear case 22. In particular, if the key 23L is depressed by a user, then a flexible leg portion 341 of the rubber contact 34 with which the key 23L engages at one end thereof buckles in the depression direction of the key 23L and a pressing portion 342 provided on the inner side of the leg portion 341 presses the contact substrate 33. Consequently, contacts 332 and 333 (refer to FIG. 17) which compose the contact substrate 33 are electrically connected to each other and an electric signal representing that the key 23L is depressed is outputted to the control substrate 31.

On the other hand, if the depression of the key 23L is canceled, the key 23L is pushed up releasing the buckled state of the leg portion 341, and then the state illustrated in FIG. 8 is restored. In particular, the rubber contact 34 functions also as a biasing member for biasing the key 23L in a direction in which it pushes up the key 23L.

It is to be noted that the rubber contact 34 is secured to the contact substrate 33, and the contact substrate 33 is secured to a pedestal 43 formed in the rear case 22. Further, the control substrate 31 is secured to the rear case 22 by a fixing member not shown.

The opening 22B4 in which such a key 23L as described above is fitted is open to the upper face 22B such that it includes the center of the rear case 22 in the thicknesswise direction (leftward and rightward direction in FIG. 8). It is to be noted that, in the present embodiment, the position of the center of the opening 22B4 in the thicknesswise direction is set substantially to the center of the rear case 22 in the thicknesswise direction.

Further, the dimension of the opening 22B4 in the thicknesswise direction is smaller than the dimension of the rear case 22 in the thicknesswise direction, and more particularly, is set to a dimension smaller than ½ (in the present embodiment, to approximately ⅓) the dimension of the rear case 22 in the thicknesswise direction. In other words, the dimension of the opening 22B4 in the thicknesswise direction substantially coincides with the dimension to the upper end face of the offset portion 22B5 in the thicknesswise direction and is set to approximately ½ the dimension of an upper face 23A hereinafter described of the key 23L in the thicknesswise direction.

Meanwhile, an end face 22B6 of the opening 22B4 on the front side which forms an end edge of the opening 22B4 (end face 22B6 on the rear side of the framework member 220) is a flat face, and the end face 22B6 serves as a guide face for protruding and retreating movement of the key 23L fitted in the opening 22B4. More particularly, a lower end of the end face 22B6 (a lower end in FIG. 8) substantially coincides with the lower end of a face 231A hereinafter described of the key 23L, and the dimension of the end face 22B6 in the heightwise direction (dimension in the upward and downward direction in FIG. 8) is set in accordance with the dimension of the face 231A in the upward and downward direction. Consequently, protruding and retreating movements of the key 23L are carried out appropriately under the guidance of the end face 22B6. It is to be noted that, although details are hereinafter described, in the present embodiment, the end face 22B6 is formed a little smaller than the face 231A, and consequently, the upper face 23A of the key 23L projects upwardly farther than the upper face 22B (upper face of the framework member 220).

Such a key 23L as described above has a body 231 and a extension 232 extending from the body 231 such that the key 23L is formed in a substantially L shape as viewed in cross section.

The body 231 is a member which is fitted at a lower end thereof in the opening 22B4 and is exposed at an upper end thereof to the outside of the rear case 22 and is protruded and retracted from and into the rear case 22 upon depression of the key 23L. Since the opening 22B4 in which the body 231 is fitted has the center substantially at the center of the upper face 22B in the thicknesswise direction as described above, and the body 231 is disposed substantially at the center of the upper face 22B in the thicknesswise direction. The face 231A on the front side of the body 231 is formed flat, and the protruding and retreating movements of the key 23L are guided by the end face 22B6 opposing to the face 231A on the front side. The dimension of the body 231 in the thicknesswise direction is set to a dimension equal to the difference of a small clearance from the dimension of the opening 22B4 in the thicknesswise direction described hereinabove.

A pressing portion 233 for pressing the rubber contact 34 described hereinabove is formed at a lower end of the body 231. A hole 2331 to be fitted by a protrusion 343 of the rubber contact 34 formed at a position corresponding to the pressing portion 342 is formed on the pressing portion 233, and the key 23L and the rubber contact 34 are connected to each other thereby. Further, the pressing portion 233 has a protrusion 2332 formed thereon such that it projects from the pressing portion 233 toward the rear face side. A tip end of the protrusion 2332 is positioned on the rear face side with respect to an end edge of the opening 22B4 in order to prevent letting off of the key 23L to the outside of the opening 22B4. Accordingly, the tip end is positioned on the front face side with respect to a tip end of the extension 232 in its extension direction. Consequently, the protruding and retreating movements of the key 23L can be prevented from being disturbed by engagement with the inner face of the rear face 22F or the like and the dimension of the rear case 22 in the thicknesswise direction can be made small.

It is to be noted that the upper end face of the protrusion 2332 is inclined with respect to the body 231 and the lower end face of the protrusion 2332 extends substantially perpendicularly to the body 231. Therefore, the protrusion 2332 has a tapering shape such that the dimension thereof in the upward and downward direction decreases toward the protruding direction.

The extension 232 is formed such that it extends to the rear face side along the upper face 22B from an end of the body 231 remote from the pressing portion 233 and covers the upper end face of the offset portion 22B5. The extension dimension of the extension 232 from the body 231 is greater than the dimension of the opening 22B4 in the thicknesswise direction described hereinabove. An end of the extension 232 on the tip end side of the body 231 in the extension direction is positioned on the front face 22A side with respect to the rear face 22F. In other words, the end is formed such that it does not contact with the installation surface when the portable electronic apparatus 1 is disposed such that the leg portions 22F1 contact with the installation surface.

Meanwhile, the lower face 232A of the extension 232 is a face extending substantially in a rectangular direction to the face of the body 231 on the rear face side. Further, the lower face 232A has a shape conforming to the upper face of the offset portion 22B5 to which the lower face 232A is opposed and the end edge of the opening 22B4, and the lower face 232A and the upper face of the offset portion 22B5 extend substantially in parallel to each other. Therefore, the offset portion 22B5 does not disturb the retreating movement of the key 23L upon depression, and the protruding and retreating movements of the key 23L can be carried out appropriately.

Such an upper face 23A of the key 23L as described above is formed from an upper face of the body 231 and an upper face of the extension 232 which is contiguous to the upper face of the body 231. The upper face 23A with which a finger of the user touches is positioned on the outer side (upwardly) with respect to the upper face 22B. However, the upper face 23A is inclined in a direction in which it approaches the upper face 22B (offset portion 22B5) toward the rear face side. Therefore, the upper face 23A has a substantially curved face shape extending along the upper face 21B of the front case 21 in a state wherein the cases 21 and 22 are placed one on the other (state illustrated in FIGS. 1 and 5).

While such an upper face 23A as described above is formed in an inclined relationship to the body 231, the lower face 232A extends substantially perpendicularly to the body 231 as described hereinabove. Therefore, the extension 232 has a tapering shape such that the dimension thereof in the upward and downward direction decreases toward the tip end in the extension direction.

Further, the dimension of the upper face 23A in the thicknesswise direction is set greater than the dimension of the opening 22B4 in the thicknesswise direction. More particularly, the dimension of the upper face 23A in the thicknesswise direction is set so as to substantially coincide with a dimension of the sum of the dimensions of the opening 22B4 and the offset portion 22B5 in the thicknesswise direction. Therefore, the dimension of the upper face 23A in the thicknesswise direction is equal to substantially twice the dimension of the opening 22B4 in the thicknesswise direction, and the area of the upper face 23A can be increased in comparison with an alternative case wherein a key on which the extension 232 is not formed is used, and the area over which the lower face 232A is engaged by a finger of the user can be expanded.

Further, since the extension direction of the extension 232 is the rearward direction and the opening 22B4 is open including the center of the upper face 22B in the thicknesswise direction and besides the dimension of the opening 22B4 in the thicknesswise direction is smaller than ½ the dimension of the rear case 22 in the thicknesswise direction (in the present embodiment, approximately ⅓), a clearance by the dimension of the upper face 22B on the front face side (dimension of the framework member 220 in the thicknesswise direction) is assured between the key 23L and the front case 21. With the configuration just described, interference of a finger when it operates (depresses) the key 23L with the front case 21 can be suppressed. Accordingly, the operability of the key 23L can be improved.

It is to be noted that also the key 23R and a control substrate for detecting an input of the key 23R, an FPC, a contact substrate and a rubber contact have similar configurations to those described above.

Figure 9:
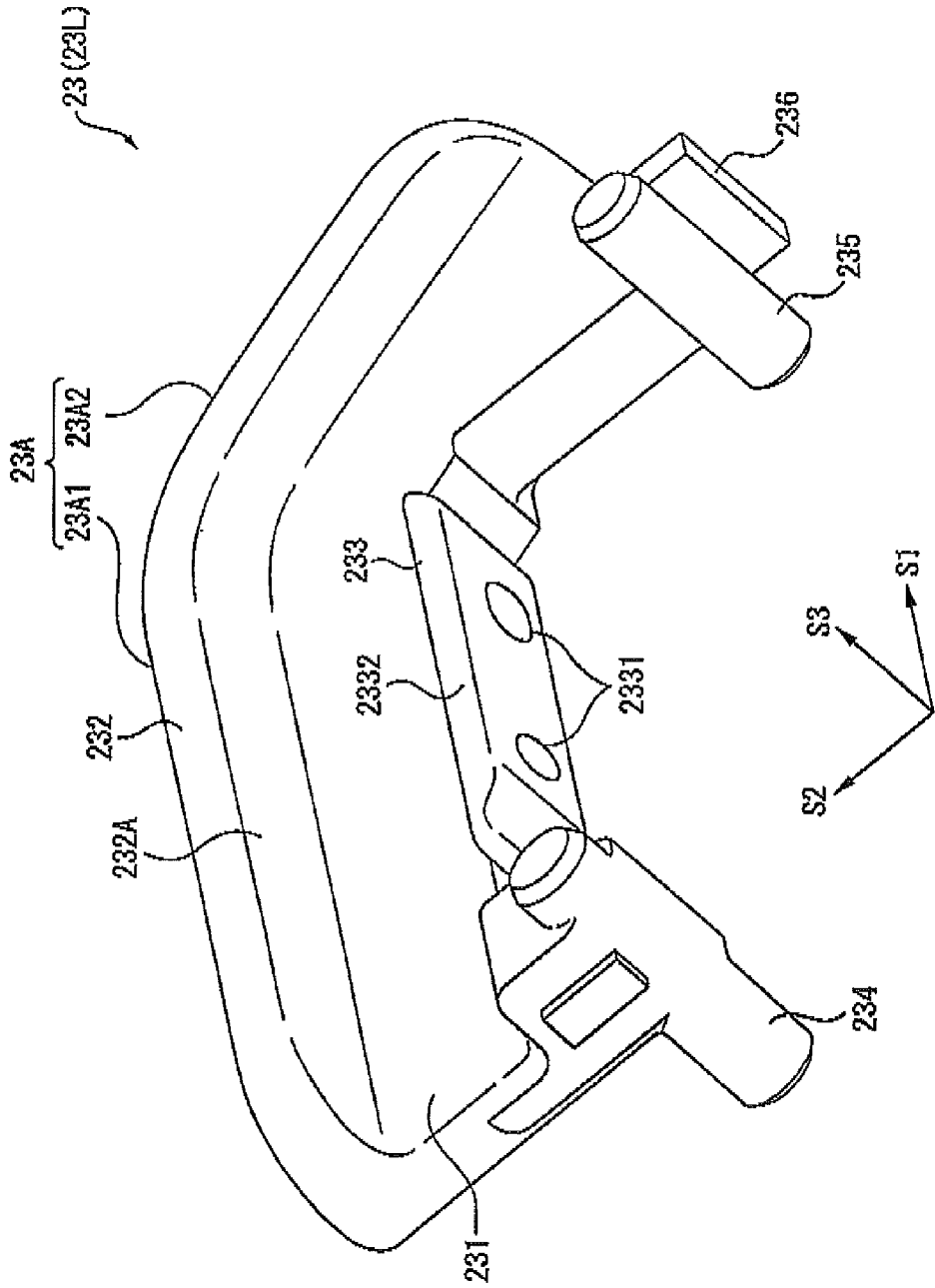
FIG. 9 is a perspective view of a key of the portable electronic apparatus as viewed from the rear side.

FIG. 9 is a perspective view of the key 23L as viewed from the rear face side.

Details of the key 23L will be described.

The key 23L includes the above-described body 231, extension 232 and pressing portion 233 as described hereinabove and further includes stems 234 and 235 and a protrusion 236 as shown in FIG. 9. The key 23L is formed as a unitary molded part made of a synthetic resin and having a generally transversely elongated shape elongated in the leftward and rightward directions (an S1 direction and a reverse direction to the S1 direction in FIG. 9 indicating the leftward direction and a first direction in the present invention) and having a substantially L shape as viewed in front elevation and vertical section. Therefore, when the key 23L is placed on a receiving portion 4 hereinafter described, the upper face 23A described hereinabove is formed from a face 23A1 extending along the upper face 22B and a face 23A2 extending along the left side face 22D. The faces 23A1 and 23A2 correspond to a first face and a second face in the present invention, respectively.

The stem 234 corresponds to a second stem in the present invention, and the stem 235 corresponds to a first stem in the present invention. The stems 234 and 235 are individually formed in a substantially cylindrical shape and positioned such that the pressing portion 233 described hereinabove are interposed therebetween. The stems 234 and 235 project to the front face side and the rear face side from the opposite left and right ends of the body 231. The stems 234 and 235 extend along directions (an S3 direction indicating the direction toward the rear face side and a reverse direction to the S3 direction in FIG. 9, and a third direction in the present invention) individually perpendicular to the leftward and rightward direction (first direction in the present invention) and the upward direction (S2 direction in FIG. 9, and a second direction in the present invention) which is the protruding direction of the key 23L when the key 23L is placed on the receiving portion 4 hereinafter described of the rear case 22.

Of the elements mentioned above, the stem 234 formed on the right side serves as a pivot shaft for the key 23L when the key 23L is depressed at a left portion thereof.

Meanwhile, the stem 235 formed on the left side serves as a pivot shaft for the key 23L when the key 23L is depressed at a right portion thereof. It is to be noted that such pivotal motion of the key 23L is hereinafter described in detail.

The protrusion 236 is formed on the further outer side with respect to the stem 235 (on the side away from the stem 234) such that it projects downwardly from the body 231. Such a protrusion 236 as just described is engaged, when the key 23L is depressed at a right side (stem 234 side) end thereof, with the rear case 22 (inner face of the left side face 22D) to prevent unnecessary pivotal motion of the key 23L and besides prevents the inside of the rear case 22 from being visually observed through the opening 22B4.

Configuration of the Receiving Portion

Figure 10:
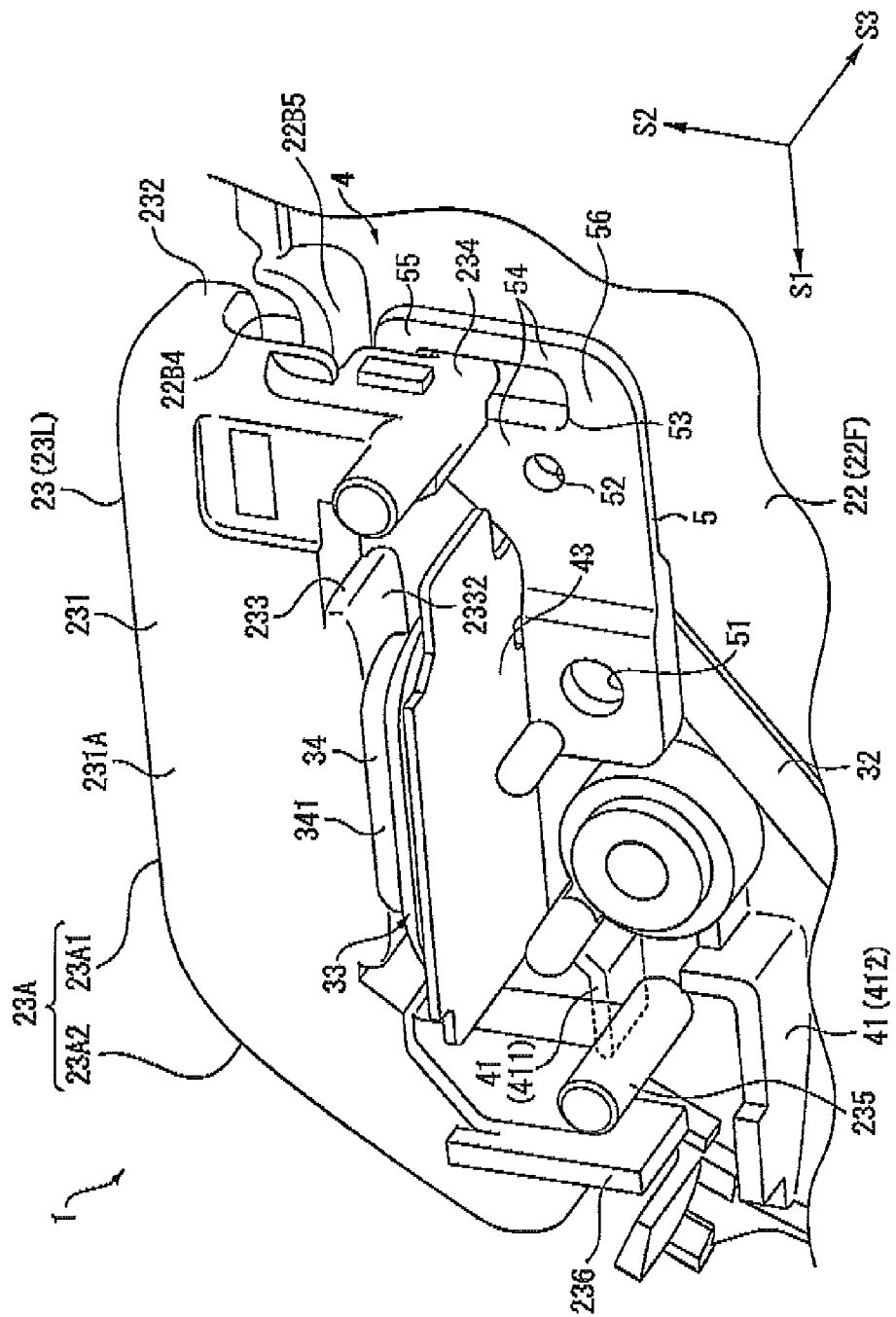
FIG. 10 is a perspective view of the key and an installation section of the portable electronic apparatus as viewed from the front side.
Figure 11:
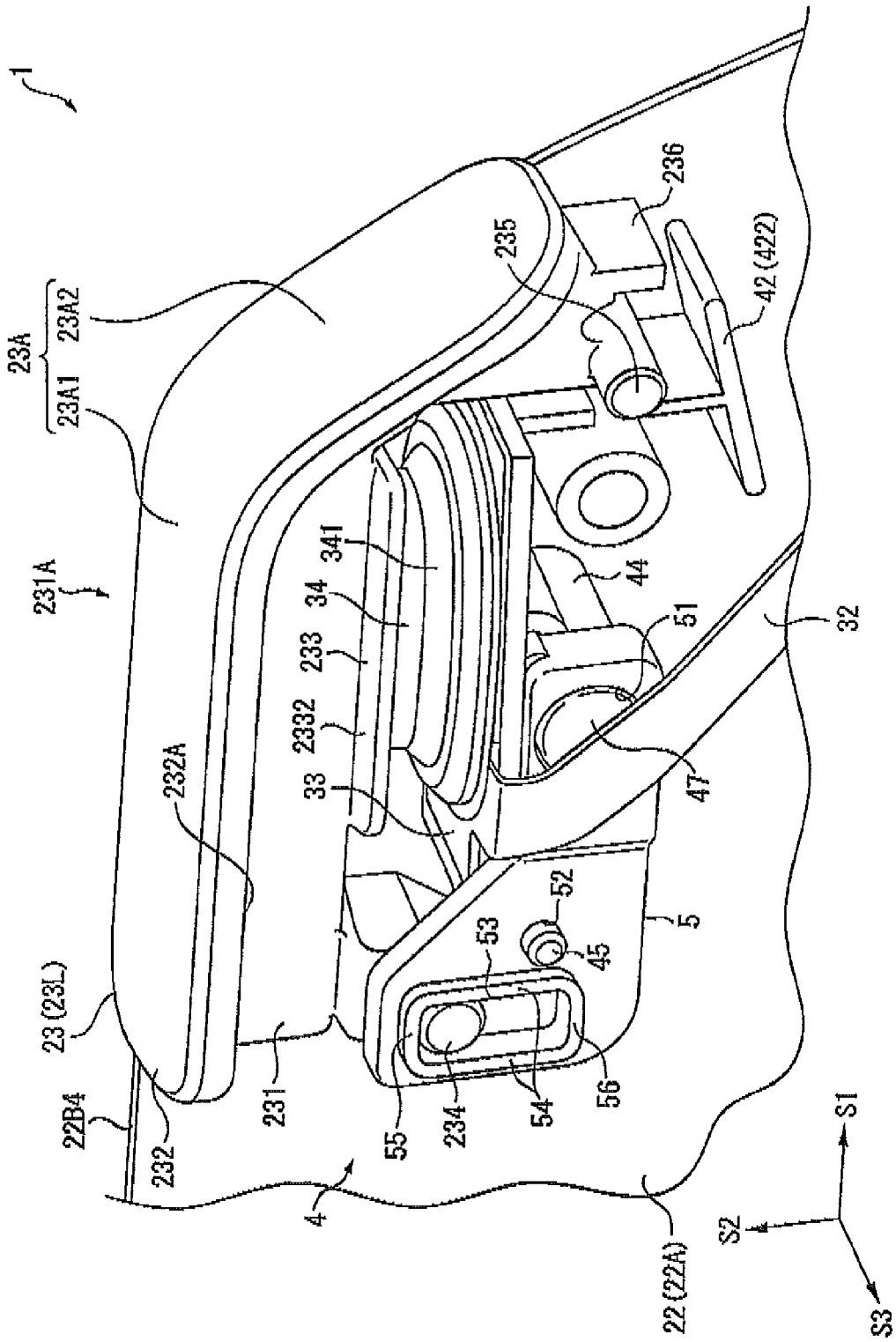
FIG. 11 is a perspective view of the key and the installation section of the portable electronic apparatus as viewed from the rear side.
Figure 12:
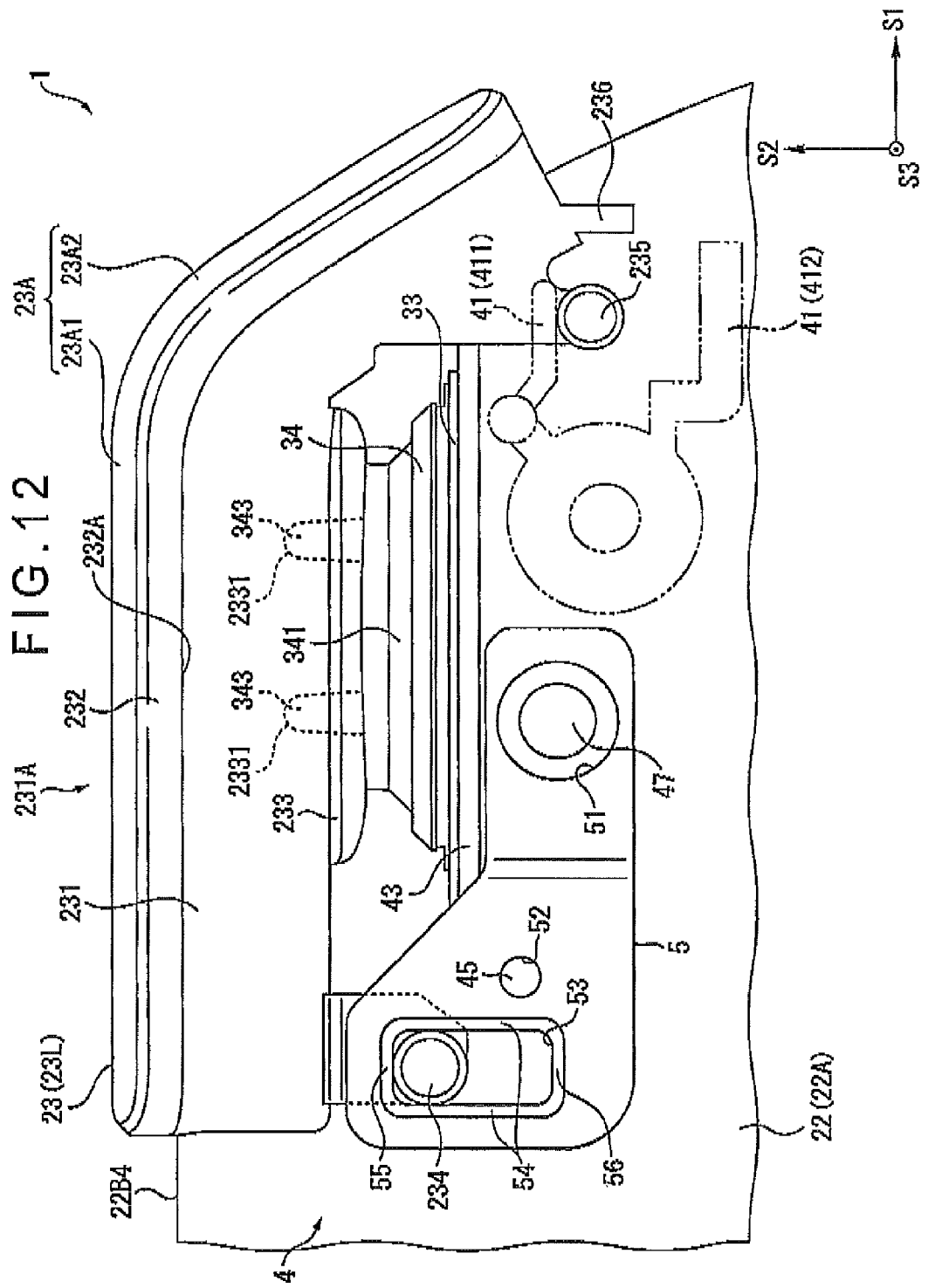
FIG. 12 is a view of the key and the installation section of the portable electronic apparatus as viewed from the rear side.
Figure 13:
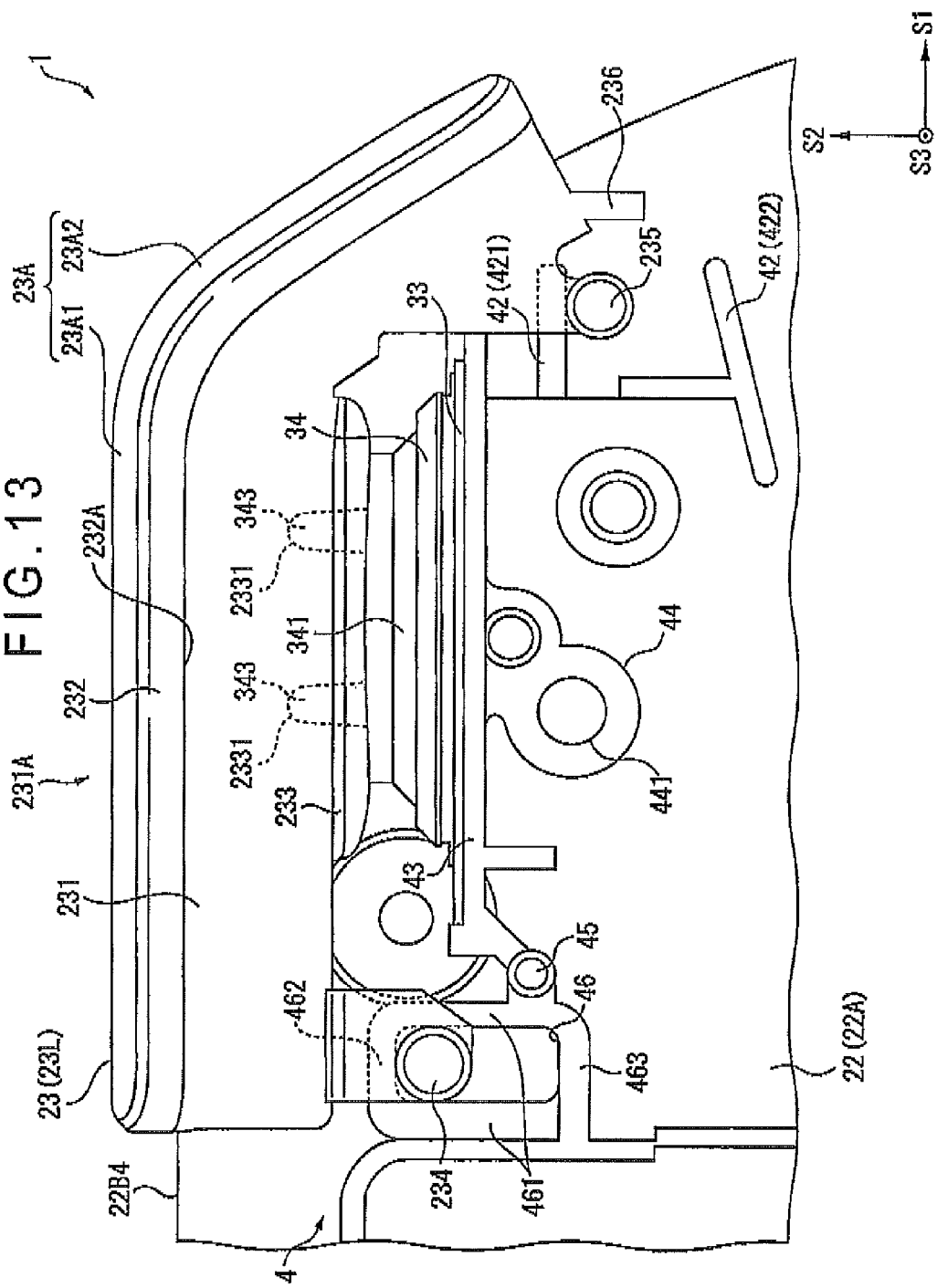
FIG. 13 is a view of the key and the installation section of the portable electronic apparatus as viewed from the rear side with a holding member removed.

FIGS. 10 to 13 are views showing the key 23L and the receiving portion 4 on which the key 23L is placed. In particular, FIGS. 10 and 11 are perspective views of the key 23L and the receiving portion 4 as viewed from the front face side and the rear face side, respectively, and FIG. 12 is a view of the key 23L and the receiving portion 4 as viewed from the rear face side. Further, FIG. 13 is a view, as viewed from the rear face side, of the body 231 and the receiving portion 4 in a state where a holding member 5 is removed from the state illustrated in FIG. 12. It is to be noted that S1 to S3 directions indicated in the figures beginning with FIG. 10 are same as the S1 to S3 directions described hereinabove, respectively.

The rear case 22 includes the receiving portion 4 on which the key 23L described hereinabove is placed and another receiving portion (not shown) on which the key 23R is placed.

As shown in FIGS. 10 to 13, the receiving portion 4 includes upright portions 41 (FIGS. 10 and 12) and 42 (FIG. 13) positioned on the left side, a pedestal 43 (FIGS. 10 to 12) positioned centrally, bosses 44 and 45 (FIGS. 11 and 13) formed below the pedestal 43, an elongated hole 46 (FIG. 13), and a holding member 5 (FIGS. 10 to 12) secured to the boss 44 and disposed on the right side with respect to the receiving portion 4.

As shown in FIGS. 10 and 12, the upright portion 41 is formed such that it is erected in an outward direction (to the rear face side) from the inner face of the rear face 22F. The upright portion 41 is formed from a pair of restricting portions 411 and 412 which extend in the S1 direction. When the key 23L is placed on the receiving portion 4, the stem 235 is disposed between the restricting portions 411 and 412.

The restricting portion 411 corresponds to a first restricting portion in the present invention. In a state wherein the key 23L is not depressed, the restricting portion 411 is engaged with the stem 235 of the key 23L biased upwardly (in the S2 direction) by the rubber contact 34 thereby to prevent letting off of the key 23L from the receiving portion 4.

On the other hand, when the key 23L is depressed at a substantially central portion or a left portion thereof, the restricting portion 412 is engaged with the stem 235 to stop movement of the key 23L by more than an unnecessary amount.

The upright portion 42 is positioned on the opposite side to the upright portion 41 with respect to the key 23L. In particular, while the upright portion 41 is formed on the rear face 22F, the upright portion 42 is formed integrally on the inner face of the front face 22A as seen in FIG. 13. The upright portion 42 is formed from a pair of restricting portions 421 and 422 which extend in an outward direction from the inner face of the front face 22A.

The restricting portion 421 corresponds to a first restricting portion in the present invention and extends in the leftward and rightward direction (S1 direction), and the restricting portion 422 is formed in a substantially inverted T shape. The restricting portions 421 and 422 are formed at positions corresponding to the restricting portions 411 and 412 and function similarly to the restricting portions 411 and 412, respectively.

As shown in FIGS. 10 to 13, the pedestal 43 is formed in a flat plate extending along the leftward and rightward direction such that it protrudes in an outward direction from the inner face of the front face 22A. The contact substrate 33 and the rubber contact 34 described hereinabove are disposed on an upper face of the pedestal 43.

The bosses 44 and 45 are provided in a projecting manner in a substantially cylindrical shape on the inner face of the front face 22A as seen in FIG. 13 and are used to attach the holding member 5 to the inner face of the front face 22A.

The boss 44 has a threaded hole 441 open toward the rear side, and a screw 47 (FIGS. 11 and 12) for securing the holding member 5 is screwed in the threaded hole 441 from the rear face side.

The boss 45 has an outer diametrical dimension smaller than that of the boss 44 and is fitted in a hole 52 formed in the holding member 5 to position the holding member 5.

The elongated hole 46 is formed on the inner face of the front face 22A as seen in FIG. 13 and has the stem 234 inserted therein. The elongated hole 46 has an end edge formed from a pair of guide portions 461 individually extending in the S2 direction and a pair of restricting portions 462 and 463 individually extending in the S1 direction and connecting the free end sides and the base end sides of the guide portions 461 in the S2 direction to each other.

The guide portions 461 which sandwich the stem 234 therebetween guide movement of the stem 234 along the S2 direction while restricting movement of the stem 234 in the S1 direction.

The restricting portions 462 and 463 define a range of movement of the stem 234, and the restricting portion 462 on the free end side in the S2 direction is engaged with the stem 234, which moves in the S2 direction by the biasing force of the rubber contact 34, to restrict jumping out of the key 23L from the rear case 22. Such a restricting portion 462 as just described corresponds to a second restricting portion in the present invention.

Configuration of the Holding Member

The holding member 5 is a member formed from a synthetic resin or a metal in a substantially L shape as viewed from the rear face side, and restricts letting off of the key 23L to the outside of the rear case 22 and guides the protruding and retreating movements of the key 23L. This holding member 5 has holes 51 and 52, and an elongated hole 53 having an end edge defined by the guide portions 54 and restricting portions 55 and 56 as seen in FIGS. 10 to 12.

The hole 51 is positioned at a left end of the holding member 5 and is formed such that it has an inner diameter smaller on the front face side than on the rear face side. The screw 47 described hereinabove for securing the boss 44 (FIG. 11) to the holding member 5 is fitted in the hole 51.

The boss 45 (FIGS. 11 and 12) for positioning the holding member 5 is fitted in the hole 52.

The elongated hole 53 corresponds to an elongated hole in the present invention together with the elongated hole 46. This elongated hole 53 is formed substantially in a rectangular shape, and the stem 234 is fitted in the elongated hole 53. Guide portions 54 which form left and right end edges of the elongated hole 53 are formed along the upward and downward direction (direction in which the key 23L protrudes and retreats). The distance between the guide portions 54 is set approximately to a dimension of the sum of the outer diametrical dimension of the stem 234 and a predetermined clearance. The guide portions 54 guide the stem 234 for movement in the direction reverse to the S2 direction when the key 23L is depressed at a substantially central portion or a right end thereof and besides restrict movement of the stem 234 in the S1 direction.

The restricting portion 55 positioned upwardly of the stem 234 from between the restricting portions 55 and 56 which form the upper and lower end edges of the elongated hole 53 corresponds to a second restricting portion in the present invention.

The restricting portion 55 is engaged, in a state wherein the key 23L is not depressed, with the stem 234 pushed up by the biasing force of the rubber contact 34 described hereinabove and restricts protrusion of the key 23L by more than a necessary amount and letting off of the key 23L from the receiving portion 4 similarly to the restricting portion 462 described hereinabove.

Further, when the key 23L is depressed at a central portion or a right end thereof and moved, the stem 234 is engaged with the restricting portion 56 to restrict movement of the key 23L by more than a necessary amount.

Operation of the Key when Depressed

In the following, operation of the key 23L when it is depressed is described.

Figure 14:
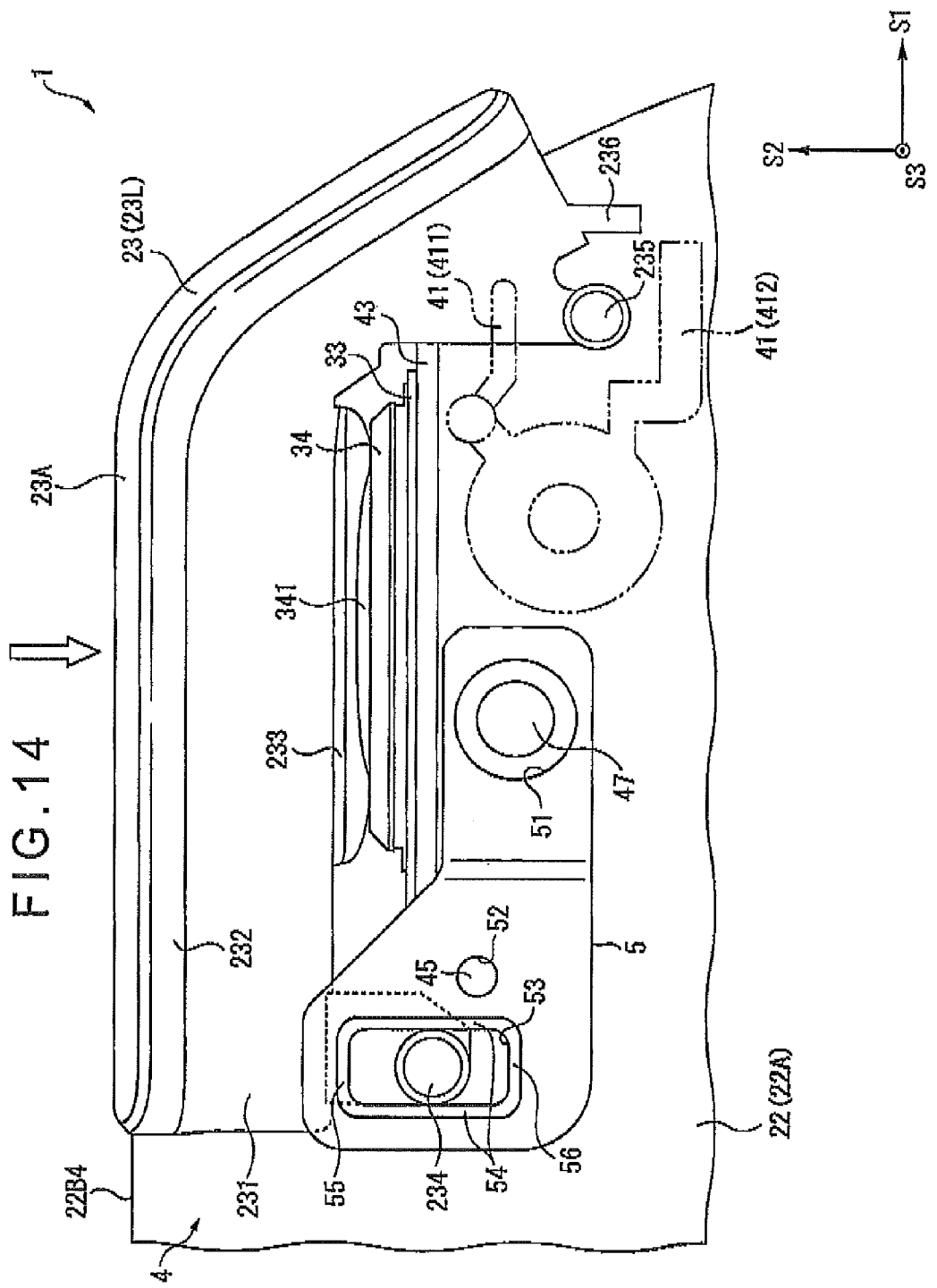
FIG. 14 is a view of the key of the portable electronic apparatus as viewed from the rear side when the key is depressed at a substantially central portion thereof.

FIG. 14 is a view of the key 23L when the upper face 23A is depressed at a central portion thereof as viewed from the rear face side.

If the upper face 23A is depressed at a central portion thereof in the leftward and rightward direction from the state illustrated in FIG. 12 (from a non-depressed state), then the entire key 23L moves in the depression direction as seen in FIG. 14. Thereupon, the stem 234 is moved downwardly along the guide portions 461 and the guide portions 54 from a position in which it contacts with the restricting portion 462 and the restricting portion 55. Meanwhile, the stem 235 is moved downwardly from a state wherein it contacts with the restricting portions 411 and 421. By such movement of the key 23L, the pressing portion 233 presses the contact substrate 33 through the rubber contact 34.

It is to be noted that, if the depression of the key 23L is canceled, then the key 23L is pushed up by the biasing force of the rubber contact 34 thereby to return the key 23L to the non-depressed state.

Figure 15:
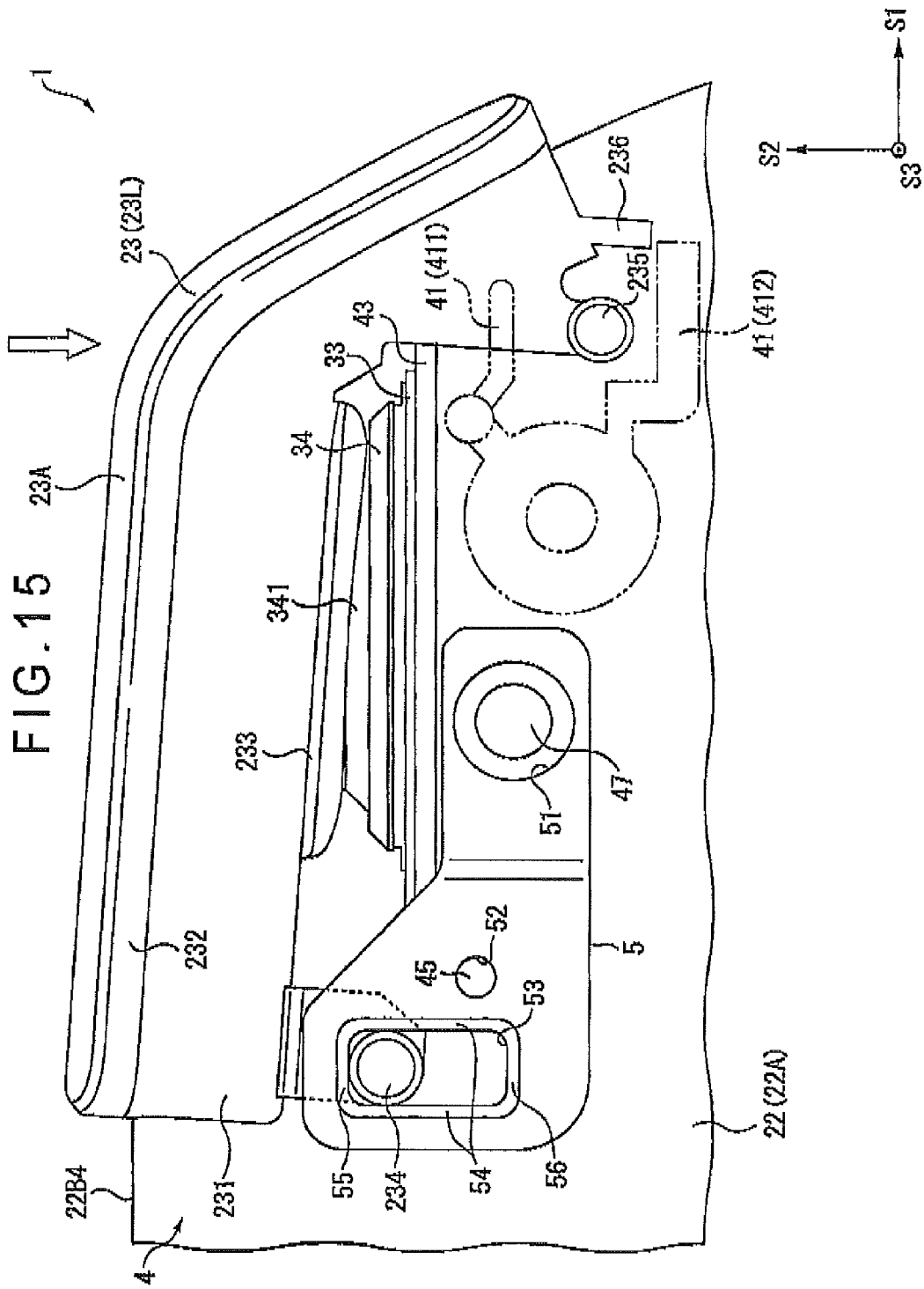
FIG. 15 is a view of the key of the portable electronic apparatus as viewed from the rear side when the key is depressed at a left portion thereof.

FIG. 15 is a view of the key 23L when the upper face 23A is depressed at a left portion thereof (right portion in FIG. 15) as viewed from the rear side.

If the upper face 23A is depressed at a left portion thereof from the state illustrated in FIG. 12, then the key 23L is pivoted in the depression direction around the stem 234, which is in a state wherein it contacts with the restricting portions 462 and 55 by the biasing force of the rubber contact 34, as seen in FIG. 15, and the pressing portion 233 pushes the contact substrate 33 through the rubber contact 34. Thereupon, since movement of the stem 234 in the leftward and rightward directions is restricted by the guide portions 461 and 54, the stem 234 moves neither downwardly nor leftwardly or rightwardly. However, the stem 235 which has been in contact with the restricting portions 411 and 421 moved downwardly while drawing an arcuate trajectory.

It is to be noted that, if the depression of the key 23L is canceled in this state, then also the stem 235 side is pushed up by the biasing force of the rubber contact 34, and consequently, the key 23L returns to the non-depressed state.

Figure 16:
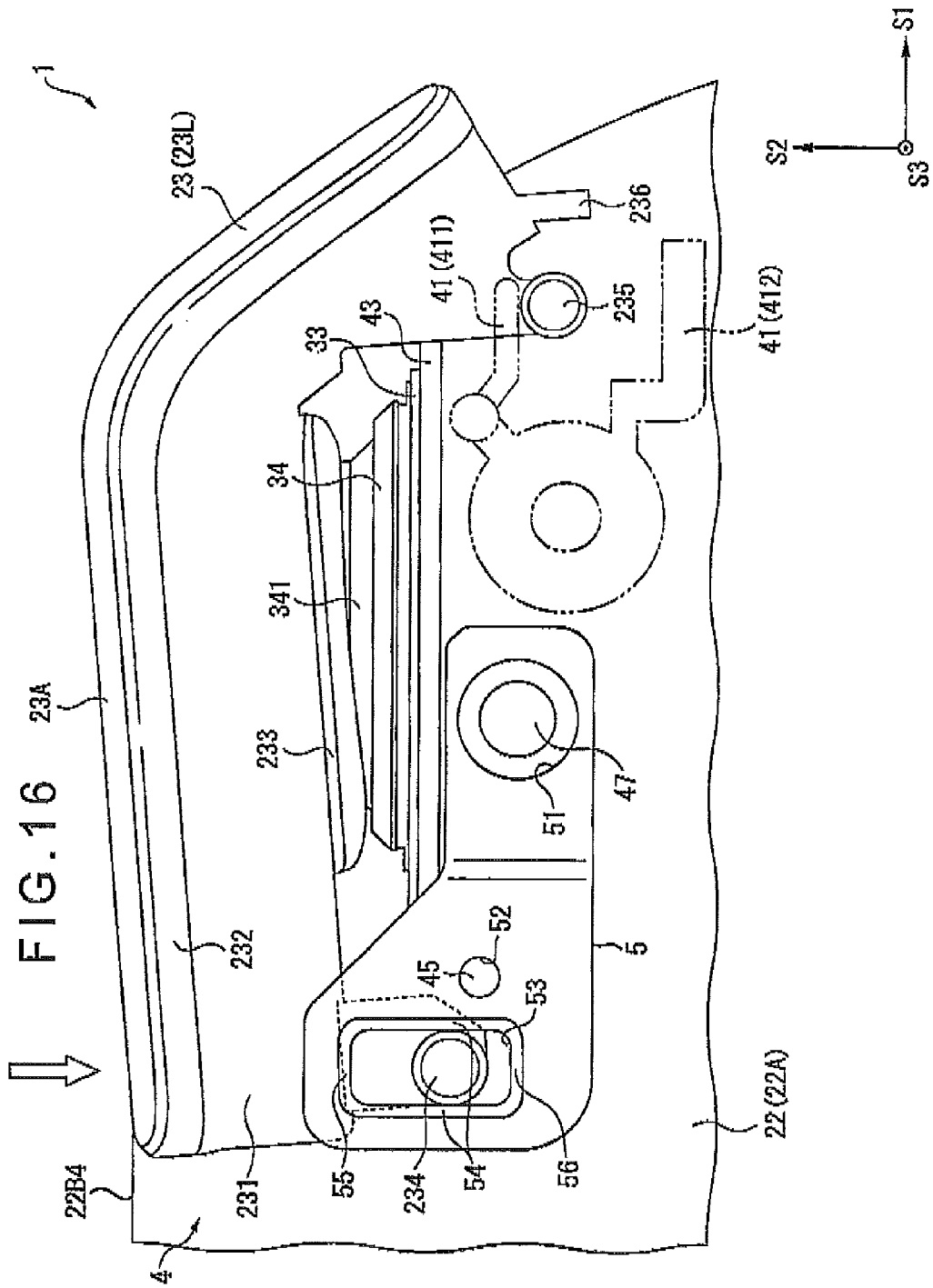
FIG. 16 is a view of the key of the portable electronic apparatus as viewed from the rear side when the key is depressed at a right portion thereof.

FIG. 16 is a view of the key 23L when the upper face 23A is depressed at a right portion (left portion in FIG. 16) thereof.

If the upper face 23A is depressed at a right portion thereof from the state illustrated in FIG. 12, then the key 23L is pivoted in the depression direction around the stem 235, which is in a state wherein it contacts with the restricting portions 411 and 421 by the biasing force of the rubber contact 34, and the pressing portion 233 presses the contact substrate 33 through the rubber contact 34. Thereupon, although the stem 234 is restricted from movement in the leftward and rightward directions by the guide portions 461 and 54, since the stem 235 is not restricted from movement in the leftward and rightward directions, the stem 235 is displaced in a direction in which it is spaced away from the stem 234 (left direction) while it remains in contact with the restricting portions 411 and 421 as the stem 234 moves downwardly along the guide portions 461 and 54. Therefore, even in the state wherein the key 23L is depressed at a right portion thereof, the pivotal motion of the key 23L is carried out without a trouble.

It is to be noted that, if the depression of the key 23L is canceled in this state, then also the stem 234 side is pushed up by the biasing force of the rubber contact 34, and together with this, the stem 235 moves in a direction in which it approaches the stem 234 while it remains in contact with the restricting portions 411 and 421. Consequently, the key 23L returns to the non-depressed state.

Configuration of the Contact Substrate

Figure 17:
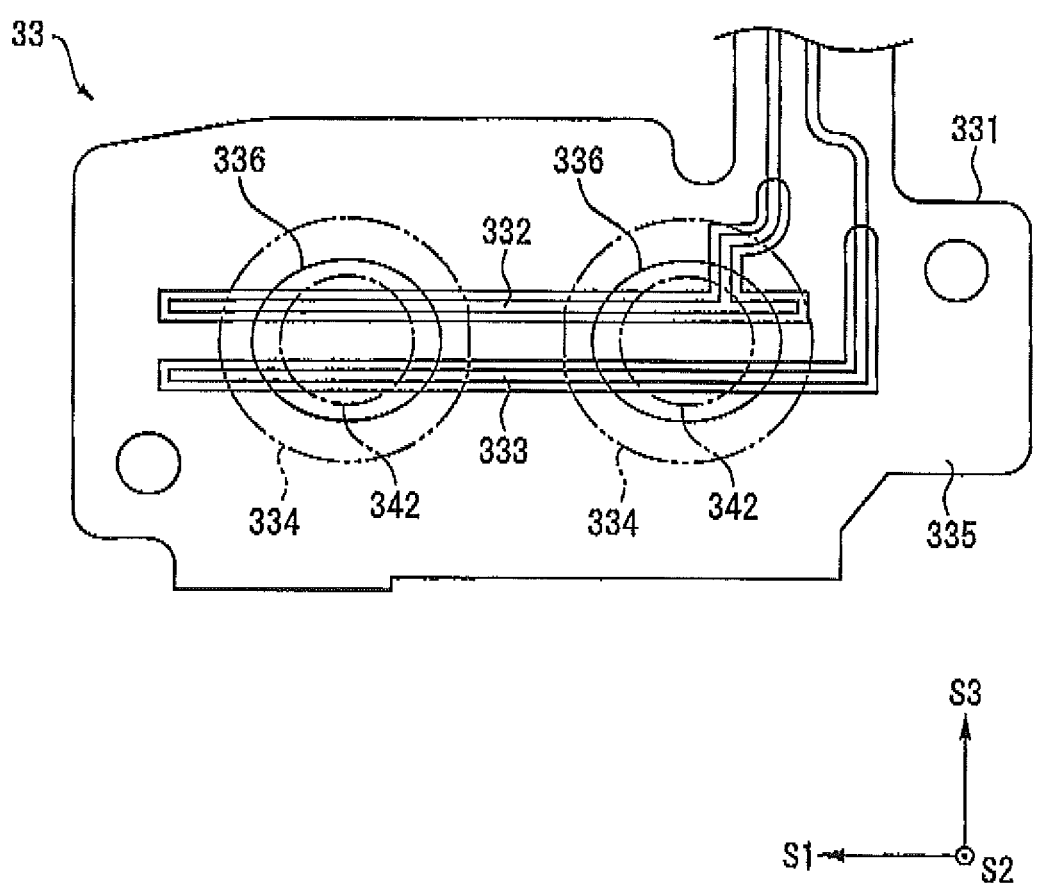
FIG. 17 is a plan view of a contact substrate of the portable electronic apparatus.

FIG. 17 is a plan view showing the contact substrate 33.

The contact substrate 33 is pushed by the key 23L through the rubber contact 34 to detect an input of the key 23L as described hereinabove. The contact substrate 33 has a substrate 331, and a first sheet, a second sheet (both not shown) and a third sheet 335 formed by lamination on the substrate 331. The first sheet is formed on the substrate 331 and the third sheet 335 forms an outer surface of the contact substrate 33.

The first sheet includes a first contact 332 and a second contact 333 formed in a spaced relationship by a predetermined distance from each other and individually having conductivity. Each of the contacts 332 and 333 is an electrode formed in a substantially L shape as viewed in plan at a substantially central portion of the first sheet and having a side extending in the longitudinal direction of the substrate 331, and is connected to the control substrate 31 through the FPC 32. This longitudinal direction coincides with the longitudinal direction (leftward and rightward direction) of the key 23L. The contacts 332 and 333 are formed such that the sides of the L shape thereof extend substantially in parallel to each other and are spaced from each other.

The second sheet is a sheet made of a synthetic resin and having non-conductivity and protects the first sheet, and besides functions as a spacer for spacing the contacts 332 and 333 described hereinabove and third contacts 336 hereinafter described from each other. A pair of openings 334 having the center between the contacts 332 and 333 and extending to the outer sides of the contacts 332 and 333 are formed at positions of the second sheet which correspond to portions in the proximity of the opposite ends of the contacts 332 and 333 in the longitudinal direction.

The third sheet 335 includes a pair of third contacts 336 formed from a material having conductivity (for example, from carbon), and the third contacts 336 are positioned in the openings 334. While the paired third contacts 336 are formed across the first contact 332 and the second contact 333, they are disposed in a spaced relationship by a predetermined distance from the contacts 332 and 333 by the second sheet described above. The third contacts 336 are depressed, upon depression of the key 23L, by the pressing portions 342 of the rubber contact 34 to electrically connect the first contact 332 and the second contact 333 to each other. It is to be noted that the position of the centers of the pressing portions 342 is set to a position substantially same as the position of the centers of the third contacts 336, and the dimension of the pressing portions 342 is set a little smaller than the dimension of the third contacts 336.

In particular, when the key 23L is depressed at a substantially central portion thereof, the third contacts 336 are pushed by the pressing portions 342, and consequently, the first contact 332 and the second contact 333 are electrically connected to each other through the third contacts 336.

On the other hand, if the key 23L is depressed at one of the opposite ends thereof in the longitudinal direction, then a corresponding one of the third contacts 336 is pushed by the corresponding pressing portion 342, and the first contact 332 and the second contact 333 are electrically connected to each other through the corresponding third contact 336.

If the first contact 332 and the second contact 333 are connected to each other through the third contact or contacts 336 in this manner, then current flowing to one of the first contact 332 and the second contact 333 flows also to the other of the first contact 332 and the second contact 333. Consequently, the current is outputted as an electric signal representing that the key 23L is inputted to the control substrate 31 to which the first contact 332 and the second contact 333 are connected through the FPC 32.

It is to be noted that the key 23R and the receiving portion and the contact substrate which are provided corresponding to the key 23R have similar configurations to those of the key 23L, receiving portion 4 and contact substrate 33, respectively, except that they are disposed in a leftwardly and rightwardly symmetrical relationship, and therefore, overlapping description of them is omitted herein to avoid redundancy. Also operation of the components mentioned when the key 23R is depressed is similar to that upon depression of the key 23L except that also the operation is carried out in a leftwardly and rightwardly symmetrical relationship, and therefore, overlapping description of the operation is omitted herein to avoid redundancy.

With the portable electronic apparatus 1 according to the present embodiment described above, the following effects are achieved. It is to be noted that effects achieved by the key 23L are achieved similarly by the key 23R which has a configuration similar to that of the key 23L except that the key 23R is leftwardly and rightwardly symmetrical to the key 23L.

The key 23L has the extensions 232 which extend to the outside of the opening 22B4 along the upper face 22B from the opposite end of the body 231 whose one end (pressing portion 233) is fitted in the opening 22B4 formed on the upper face 22B. With the configuration just described, the area of the upper face 23A of the key 23L which is exposed to the outside of the rear case 22, that is, the area of the upper face 23A which opposes to a finger of the user, can be increased. Therefore, the key 23L can increase the area over which the key 23L can be depressed by a finger of the user in comparison with another key which does not have the extension 232. Further, since the contact area with a finger can be increased, depression and inputting of the key 23L can be carried out with certainty. Accordingly, the operability of the portable electronic apparatus 1 can be improved.

Further, since the extension 232 is formed so as to extend to the outside from the end edge of the opening 22B4, there is no necessity to form the opening 22B4 in a large size in accordance with the area of the upper face 23A. Therefore, the thicknesswise dimension of the rear case 22 can be reduced in comparison with that in an alternative case wherein a key corresponding to the opening area of the opening 22B4 is disposed. Accordingly, reduction in thickness of the portable electronic apparatus 1 can be anticipated.

Further, since the extension direction of the extension 232 from the body 231 is the direction toward the rear face 22F side, interference of the extension 232 and hence of the key 23L with the front case 21 positioned on the front face side can be prevented and a finger which operates the key 23L can be suppressed from interfering with the front case 21. In addition, since a clearance suitable for the framework member 220 is assured between the key 23L and the front case 21, interference between the finger and the front case 21 can be further suppressed. Accordingly, the operability of the portable electronic apparatus 1 can be further improved.

Since the rear case 22 is formed in a substantially flattened configuration having a substantially oval shape as viewed in front elevation, the user can grasp the rear case 22 in such a manner that fingers (for example, forefingers) thereof extend along the left and right side faces 22D and 22E, and consequently, the rear case 22 can be grasped readily. Further, where the rear case 22 is grasped in this manner, since the keys 23L and 23R are positioned at the opposite left and right ends of the upper face 22B on which the fingertips of the fingers are positioned, the keys 23L and 23R can be depressed readily. Further, since the keys 23L and 23R have the configuration described above, they can be depressed with certainty without depending upon the manner of engagement of the fingers. Accordingly, the operability of the portable electronic apparatus 1 can be improved.

Where the upper face 23A of the key 23L is inclined in a direction in which it is spaced away from the upper face 22B toward the rear face 22F, an end of the upper face 23A on the rear face 22F side protrudes from the upper face 22B without extending along the outer shape of the rear case 22. In this instance, since it becomes less easy for the fingers to extend along the rear case 22, it becomes less easy to grasp the rear case 22 and carry out an inputting operation of the key 23L.

In contrast, since the upper face 23A is inclined in a direction in which it approaches the upper face 22B (offset portion 22B5) toward the rear face 22F, the upper face 23A extends along the outer shape of the rear case 22, and consequently, the user can extend the fingers along the rear case 22 readily. Accordingly, the rear case 22 and hence the portable electronic apparatus 1 can be grasped easily and an inputting operation of the key 23L can be carried out easily.

Where an end of the extension 232 on the rear face 22F side otherwise protrudes to the rear face side from the rear face 22F, if the portable electronic apparatus 1 is disposed such that the rear face 22F opposes to the installation face (the leg portions 22F1 contact with the installation face), then the key 23L contacts with the installation face. In this instance, the load of the portable electronic apparatus 1 is applied to the key 23L, and the load to the key 23L increases.

In contrast, since an end of the extension 232 on the rear face 22F side is positioned on the front face 22A side with respect to the rear face 22F, even if the portable electronic apparatus 1 is disposed in such a manner as described above, the key 23L can be prevented from contacting with the installation face. Accordingly, application of a load to the key 23L can be prevented.

Since the extension 232 is formed such that it covers the offset portion 22B5 formed in conformity with the opening 22B4, the stroke value of the key 23L can be assured with the offset between the upper face 22B and the offset portion 22B5. With the configuration just described, there is no necessity to cause the key 23L to protrude unnecessarily from the upper face 22B in order to assure the stroke amount. Accordingly, miniaturization of the portable electronic apparatus 1 can be anticipated.

Further, since the upper face 23A of the key 23L protrudes to the outer side of the rear case 22 from the upper face 22B, upon depression of the key 23L, the entire key 23L can be prevented from being fully retracted into the upper face 22B, and consequently, the key 23L can be prevented from being placed into a state wherein it cannot be depressed successively. Accordingly, the operability of the portable electronic apparatus 1 can be improved further.

In the state wherein the key 23L is not depressed, the stem 234 contacts with the restricting portions 411 and 421 and the stem 235 contacts with the restricting portions 462 and 55 by the biasing force of the rubber contact 34, and consequently, letting off of the key 23L from the rear case 22 can be prevented.

If the upper face 23A is depressed at a substantially central portion thereof in the leftward and rightward direction, the movement of the key 23L in the depression direction is guided by the guide portions 461 and 54 by which the stem 234 is sandwiched. Thereupon, rocking motion of the key 23L in the leftward or rightward direction can be restricted by the guide portions 461 and 54. Further, also where the upper face 23A is depressed at a left end side portion or a right end side portion thereof, rocking motion of the key 23L in the leftward and rightward directions can be restricted by the guide portions 461 and 54.

Accordingly, at whichever position the key 23L is depressed, rocking motion of the key 23L in the leftward and rightward directions (S1 direction) according to protruding or retreating movement of the key 23L can be suppressed. Consequently, an inputting operation of the key 23L can be carried out with certainty and the operation of the key 23L can be stabilized. Furthermore, since the key 23L carries out movement or rocking motion in the depression direction in response to the depression position, there is no necessity to provide a long guide along which the entire key is to be moved in the depression direction. Accordingly, the portable electronic apparatus 1 can be further reduced in size.

Since the holding member 5 secured to the receiving portion 4 and the inner face of the front face 22A have the guide portions 54 and 461, respectively, and the key 23L has the stem 234, in comparison with an alternative case wherein the rear case 22 has a stem and the key 23L has a guide portion, miniaturization of the key 23L can be anticipated. Consequently, the range of movement of the key 23L can be reduced, and miniaturization of the rear case 22 can be anticipated. Accordingly, the portable electronic apparatus 1 can be further reduced in size.

Further, since the stem 235 is restricted from movement in the S2 direction by the restricting portions 411 and 421 positioned on the rear face side and the front face side, rattling of the key 23L can be suppressed and besides the pivotal motion of the key 23L where it is depressed at an end thereof on the stem 234 side can be stabilized. Similarly, since the stem 234 is guided for movement in the S2 direction by the guide portions 461 which sandwich an end of the stem 234 on the front face side and the guide portions 54 which sandwich an end of the stem 234 on the rear face side, the movement of the stem 234 can be stabilized. Accordingly, operation of the key 23L can be stabilized.

Since the guide portions 461 and the restricting portions 462 and 463 are formed as end edges of the elongated hole 46 and the guide portions 54 and the restricting portions 55 and 56 are formed as end edges of the elongated hole 53, the guide portions 461 and 54 and the restricting portions 462, 463 and 55, 56 can be formed readily and besides the configuration of the receiving portion 4 and hence of the inner face of the rear case 22 can be simplified.

Further, since the restricting portions 411 and 421 are formed integrally on the inner face of the rear case 22, they can be formed simply and readily and the configuration of the rear case 22 can be further simplified. Furthermore, since the restricting portions 411 and 421 are formed so as to extend along the S1 direction, when the key 23L is depressed at an end thereof on the stem 234 side, the contacting state between the stem 235 which moves in a direction in which it is spaced away from the stem 234 and the restricting portions 411 and 421 can be maintained. Consequently, pivotal motion of the key 23L around the stem 235 can be carried out smoothly.

The stem 234 is disposed at a position of the upper face 22B rather near to the center with respect to the stem 235 when the key 23L is disposed on the receiving portion 4. Since the opposite ends of the stem 234 are sandwiched by the guide portions 461 and 54, respectively, upon movement and pivotal motion of the key 23L, the stem 234 does not substantially move in the leftward and rightward direction (S1 direction). Therefore, when the key 23L is pivoted around the stem 235, movement of the stem 234 in the leftward and rightward direction is not restricted, and the clearance between the end (right end) of the key on the stem 234 side and the upper face 22B (end edge of the opening 22B4) can be further reduced in comparison with that in an alternative case wherein the key 23L is pivoted such that an end thereof on the stem 234 side moves along an arcuate trajectory. Accordingly, the dimension of the upper face 22B can be reduced, and hence, further miniaturization of the portable electronic apparatus 1 can be anticipated.

The key 23L is disposed such that it extends between and over the upper face 22B and the left side face 22D, and the upper face 23A is formed from the face 23A1 extending along the upper face 22B and the face 23A2 extending along the left side face 22D. According to this configuration, the fingers which grasp the rear case 22 can extend readily along the key 23L. Accordingly, the key 23L can be depressed with a higher degree of certainty, and the operability of the portable electronic apparatus 1 can be further improved. Furthermore, since the shape of the key 23L exposed to the outside of the rear case 22 extends along the shape of the rear case 22, a good appearance of the portable electronic apparatus 1 can be assured.

2. Second Embodiment

Now, a portable digital assistant 1A according to a second embodiment of the present invention is described.

The portable electronic apparatus 1A according to the present embodiment has a configuration similar to that of the portable electronic apparatus 1 of the first embodiment described above. However, the portable electronic apparatus 1A of the present embodiment is different from the portable electronic apparatus 1 of the first embodiment in that, while, in the portable electronic apparatus 1 described above, the contact substrate 33 includes the first contact 332 and the second contact 333 which individually have a substantially L shape, a contact substrate 35 of the portable electronic apparatus 1A includes a first contact and a second contact of a comb-tooth shape disposed in an opposing relationship to each other. It is to be noted that, in the following description, like elements or substantially like elements to those described hereinabove are denoted by like reference characters and overlapping description of them is omitted herein to avoid redundancy.

Figure 18:
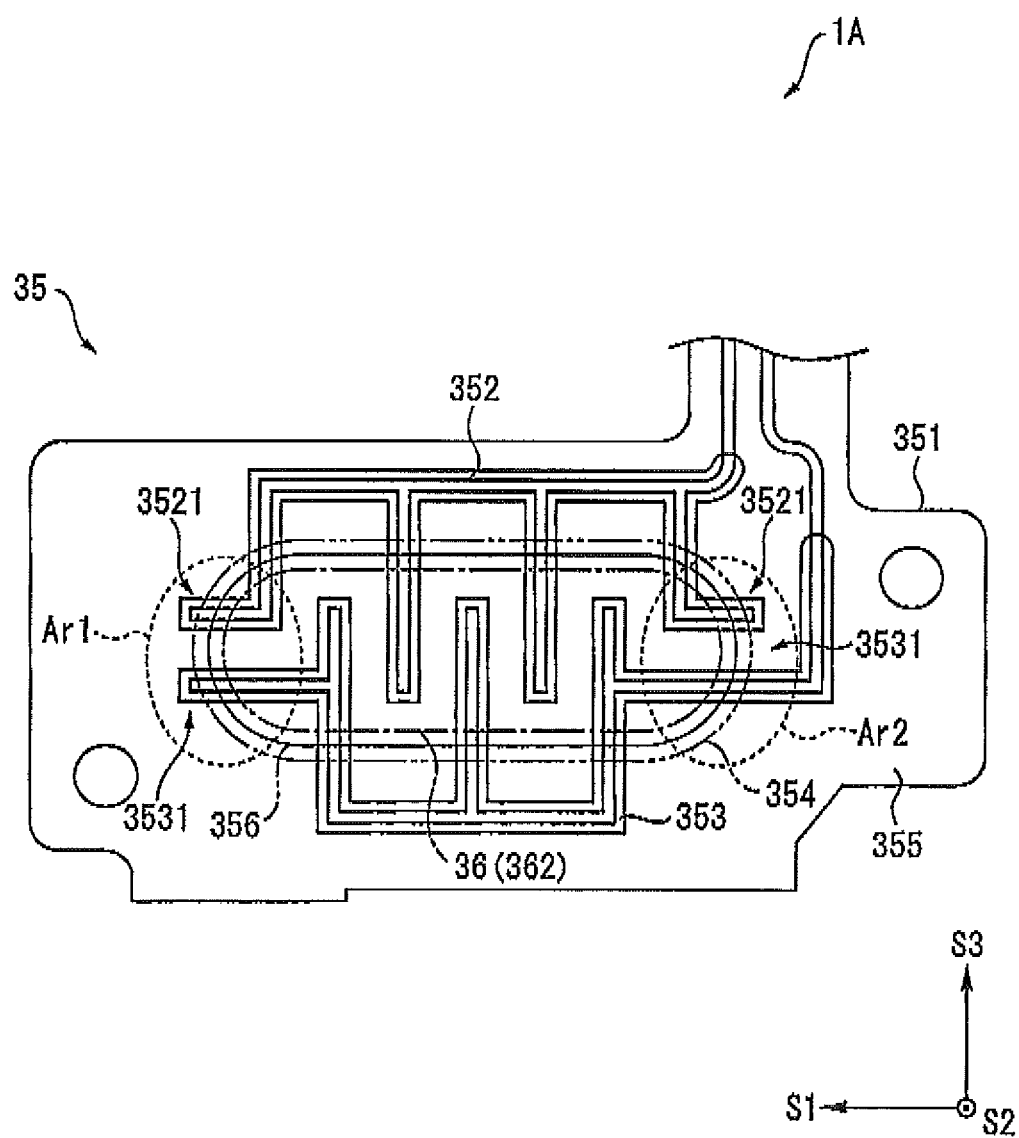
FIG. 18 is a plan view showing a contact substrate of a portable electronic apparatus according to a second embodiment of the present invention.

FIG. 18 is a plan view showing the contact substrate 35 of the portable electronic apparatus 1A according to the present embodiment.

The portable electronic apparatus 1A of the present embodiment has a configuration similar to that of the portable electronic apparatus 1 described hereinabove except that it includes the contact substrate 35 and a rubber contact 36 in place of the contact substrate 33 and the rubber contact 34. Further, the rubber contact 36 has a configuration similar to that of the rubber contact 34 except that it includes a transversely elongated pressing portion 362 conforming to the contacting face with the pressing portion 233 in place of a pair of pressing portions 342.

As shown in FIG. 18, the contact substrate 35 has a substrate 351, and a first sheet, a second sheet (both not shown) and a third sheet 355 laminated on the substrate 351.

The first sheet laminated on the substrate 351 has a first contact 352 and a second contact 353 which are electrodes each having a comb-tooth shape and disposed in a spaced relationship from and in an opposing relationship to each other. The first contact 352 and the second contact 353 have, at the opposite ends thereof in a direction corresponding to the longitudinal direction of the substrate 351, that is, at the opposite ends thereof in a direction corresponding to the longitudinal direction of the key 23L, extensions 3521 and 3531 which extend substantially in parallel to each other.

The second sheet has a function similar to that of the second sheet described hereinabove and is adhered to the first sheet. The second sheet has a substantially oval opening 354 elongated along the longitudinal direction of the substrate 351 (which coincides with the longitudinal directions of the keys 23L and 23R) within ranges within which the first contact 352 and the second contact 353 are formed.

The third sheet 355 is adhered to the second sheet and forms an outer surface of the contact substrate 35. The third sheet 355 has a third contact 356 formed at a position corresponding to the opening 354 and formed from a material (for example, carbon) having conductivity.

The third contact 356 is formed in a substantially oval shape in accordance with the shape of the opening 354 and is disposed in a spaced relationship by a predetermined distance from the contacts 352 and 353 such that it extends across the first contact 352 and the second contact 353. The third contact 356 is abutted by a pressing portion 362 formed a little smaller than the third contact 356 and in a transversely elongated shape such that the longitudinal directions thereof coincide with each other. If the third contact 356 is depressed by the pressing portion 362, then it electrically connects the first contact 352 and the second contact 353 to each other.

In the contact substrate 35 having such a configuration as described above, even if the key 23L is depressed at one end or the opposite end thereof and the contact 352 or 353 is depressed in a region An1 or Ar2 corresponding to the one end or the other end of the key 23L by the corresponding pressing portion 362, the extensions 3521 and 3531 are electrically connected to each other through the third contact 356. Even if the key 23L is depressed at a central portion thereof and the contacts 352 and 353 are depressed at central portions thereof by the pressing portion 362, the contacts 352 and 353 are electrically connected to each other through the third contact 356. Consequently, current flowing to one of the contacts 352 and 353 flows to the other one of the contacts 352 and 353 and is outputted as an electric signal to the control substrate 31, and the control substrate 31 recognizes that the key 23L is depressed.

With the portable electronic apparatus 1A according to the present embodiment described above, similar effects to those of the portable electronic apparatus 1 described hereinabove are achieved.

It is to be noted that, while the rubber contact 36 of the portable electronic apparatus 1A includes the transversely elongated pressing portion 362, it may otherwise be configured such that it includes a pair of pressing portions similarly to the rubber contact 34 described hereinabove. In this instance, the rubber contact 36 may be configured such that the pressing portions are disposed at positions at which they cover at least the third contact 356 in the regions An1 and Ar2.

3. Modifications to the Embodiments

The present invention is not limited to the embodiments described above, but all modifications, improvements and so forth which fall within the scope thereof within which the object of the present invention can be achieved are included in the present invention.

While, in the embodiments described above, the keys 23L and 23R are provided at the opposite ends of the upper face 22B in the leftward and rightward direction, the present invention is not limited to this, and the keys 23L and 23R may be disposed at a central portion of the upper face 22B or on some other side face. In other words, the disposition position and the number of keys may be set suitably, and also the longitudinal directions of the keys may not coincide with the leftward and rightward direction of the housing. Further, the keys may be provided on the front case 21.

While, in the embodiments described above, the rear case 22 as a housing includes the front face 22A, the rear face 22F and the upper face 22B, lower face 22C and left and right side faces 22D and 22E which connect the front face 22A and the rear face 22F to each other and is formed in a substantially flattened configuration of a substantially oval shape as viewed in front elevation, the present invention is not limited to this. In particular, the housing may be in a substantially rectangular shape or a substantially circular shape as viewed in front elevation and may have any shape. It is to be noted that preferably the housing has a shape and a size with which it can be grasped at least by one hand.

Further, while, in the embodiments described above, the front case 21 is provided for sliding movement with respect to the rear case 22, the present invention is not limited to this and the front case 21 and the rear case 22 may be formed as an integrated unitary housing.

Further, while, in the embodiments described above, the upper face 23A of the key 23 is inclined in a direction in which it approaches the offset portion 22B5 of the upper face 22B toward the rear face 22F, the present invention is not limited to this. In particular, the face of the key 23 extending along a side face on which the LR keys 23 are disposed may extend substantially in parallel to the side face or may be inclined in a direction in which it is spaced away from the side face toward the rear face. Further, also the extension direction of the extension 232 is not limited to the direction toward the rear face 22F side, but may be, for example, a direction toward the side face side which approaches the key 23 and may be any direction.

While, in the embodiments described above, an end of the extension 232 on the rear face 22F side, that is, an end on the tip end side in the extension direction, is positioned on the front face 22A side with respect to the rear face 22F, the present invention is not limited to this. In particular, the end mentioned may be positioned on the rear face side with respect to the rear face 22F.

Further, while, in the embodiments described above, the key 23L has a substantially L shape such that it extends between and over the upper face 22B and the left side face 22D, the present invention is not limited to this but may be formed such that it is disposed on only one of the upper face 22B and the left side face 22D. It is to be noted that this similarly applies also to the key 23R.

While, in the embodiments described above, the upper face 22B has the offset portion 22B5 which is concave toward the inner side of the rear case 22 from the upper face 22B, the present invention is not limited to this, and the offset portion 22B5 need not be provided. In this instance, only it is necessary for the extension 232 of the key 23 to extend to the outer side farther than the end edge of the opening 22B4.

Further, while, in the embodiments described above, the upper face 23A protrudes to the outer side with respect to the upper face 22B, that is, to a position higher than the upper face 22B, the present invention is not limited to this. For example, the upper face 23A before depression may be in flush with the upper face 22B or may be retracted from the upper face 22B.

While, in the embodiments described above, the offset portion 22B5 formed on the upper face 22B is formed on the rear face side with respect to the opening 22B4, the present invention is not limited to this. In particular, the position of the offset portion 22B5 covered with the extension 232 may be the front face side of the opening 22B4 or the offset portion 22B5 may be formed on both of the front face side and the rear face side. Similarly, also the extension direction of the extension 232 from the body 231 may not be the rear face side direction but may be the front face side direction.

While, in the embodiments described above, the stem 234 as the second stem functions as a second stem guided by the guide portions 54 and 461, the present invention is not limited to this. In particular, guide portions may be provided in such a manner as to sandwich an end of the stem 235 so as to function as the second stem. Further, in addition to the stems 234 and 235, a different stem which functions as the first stem or the second stem may be provided on the key or guide portions which sandwich the stem may be further provided on the rear case. In this instance, the positions of the stem and the guide portions may be set suitably. It is to be noted that this similarly applies not only to the key 23L but also to the key 23R.

While, in the embodiments described above, the key 23L has the stem 234 which functions as the second stem and the receiving portion 4 and the holding member 5 have the guide portions 461 and 54, the present invention is not limited to this. For example, the key may have a guide portion and the rear case as a housing may have a stem guided by the guide portion. Further, the guide portions disposed in an opposing relationship with each other with the key interposed therebetween may be formed on the inner face of the rear case 22, or may be provided on members attached to the rear case 22 like the holding member 5. It is to be noted that the foregoing applies not only to the key 23L and the receiving portion 4 but also the key 23R and the receiving portion at which the key 23R is disposed.

While, in the embodiments described above, the guide portions 461 and 54 which sandwich the end of the stem 234 are provided on the front face 22A side and the rear face 22F side with the key 23L interposed therebetween and the restricting portions 462 and 55 for restricting protrusion of the stem 234 in the S2 direction are similarly provided on the front face 22A side and the rear face 22F side with the key 23L interposed therebetween and besides the restricting portions 421 and 411 which restrict protrusion of the stem 235 in the S2 direction are provided on the front face 22A side and the rear face 22F side with the key 23L interposed therebetween, the present invention is not limited to this. In other words, the guide portions and the restricting portions which engage with the stem 234 and the restricting portions which engage with the stem 235 may be provided on at least one of the front face side and the rear face side.

While, in the embodiments described above, the restricting portions 421 and 411 are formed integrally on the inner faces of the front face 22A and the rear face 22F, the present invention is not limited to this and the restricting portions 421 and 411 may be positioned in the rear case 22.

While, in the embodiments described above, the guide portions 461 and the restricting portions 462 and 463 form an end edge of the elongated hole 46 into which the stem 234 is inserted and the guide portions 54 and the restricting portions 55 and 56 form an end edge of the elongated hole 53 into which the stem 234 is also inserted, the present invention is not limited to this. In particular, the guide portions and the restricting portions may be disposed in a spaced relationship from each other.

While, in the embodiments described above, the portable electronic apparatus 1 which can process a game program, image data and sound data is taken as an example of a controller and a portable electronic apparatus of the present invention, the present invention is not limited to this. For example, also it is possible to apply the present invention to a controller connected to a game machine, a PC or the like of the stationary type. Further, the portable electronic apparatus may be of the type which can process at least one of a game program, image data and sound data or of the type which can execute a different application program. In particular, the present invention can be applied to any portable electronic apparatus which can be carried and can process some program and data, and the present invention may be applied to a digital camera and so forth. It is to be noted that, where the present invention is applied to a digital camera, the key in the present invention may be a shutter key.

It should be understood by those skilled in the art that various modifications, combinations, sub-combinations and alternations may occur depending on design requirements and other factors insofar as they are within the scope of the appended claims or the equivalent thereof.

What is claimed is:

1. A controller, comprising:
 a housing; and
 at least one key provided for protruding and retreating movement on the housing;
 the key comprising:
 a body formed in a transversely elongated configuration elongated in a first direction; and
 a first stem positioned on one end side of the body in the first direction and extending along a third direction which is substantially perpendicular to the first direction and a second direction which is a protruding direction of the key from the housing, and the housing comprising:
 a biasing member for biasing the key in the second direction; and
 a first restricting portion positioned on the second direction side with respect to the first stem for engaging with the first stem biased by the biasing member, wherein
 one of the key and the housing has a second stem positioned on the other end side of the first direction and extending in the third direction while the other of the key and the housing has a guide portion which sandwiches an end of the second stem for guiding movement of the second stem in the second direction and a second restricting portion for engaging with the second stem biased by the biasing member.

2. The controller according to claim 1, wherein the housing has the guide portion and the key has the second stem.

3. The controller according to claim 2, wherein the housing has an elongated hole which has an end edge defined by the guide portion and the second restricting portion and in which the second stem is inserted.

4. The controller according to claim 2, wherein at least one of the first restricting portion, second restricting portion and guide portion is provided on the third direction side and the opposite side to the third direction side with the key sandwiched therebetween.

5. The controller according to claim 1, wherein the first restricting portion is erected uprightly along the first direction from the inner face of the housing and is formed integrally with the housing.

6. The controller according to claim 1, wherein the housing has a front face, a rear face and a side face for connecting the front face and the rear face to each other and is formed in a substantially flattened configuration having a substantially oval shape as viewed in front elevation; and the key is disposed at least at one of the opposite ends in a leftward and rightward direction of the side face which is positioned at an upper location when the housing is grasped so that the first direction coincides with the leftward and rightward direction.

7. The controller according to claim 6, wherein the second stem is disposed at a position rather near to the center of the side face which is positioned at the upper location.

8. The controller according to claim 6, wherein the key is disposed so as to extend between and over the side face positioned at the upper location and a different side face which is contiguous to the side face, and an upper face of the key has a first face extending along the side face positioned at the upper location and a second face extending along the different side face.

9. A portable electronic apparatus, comprising:
a controller including
a housing, and
at least one key provided for protruding and retreating movement on the housing,
the key comprising:
a body formed in a transversely elongated configuration elongated in a first direction, and
a first stem positioned on one end side of the body in the first direction and extending along a third direction which is substantially perpendicular to the first direction and a second direction which is a protruding direction of the key from the housing, and the housing comprising:
a biasing member for biasing the key in the second direction; and
a first restricting portion positioned on the second direction side with respect to the first stem for engaging with the first stem biased by the biasing member, wherein
one of the key and the housing has a second stem positioned on the other end side of the first direction and extending in the third direction while the other of the key and the housing has a guide portion which sandwiches an end of the second stem for guiding movement of the second stem in the second direction and a second restricting portion for engaging with the second stem biased by the biasing member.

* * * * *